(12) United States Patent
Tanaka et al.

(10) Patent No.: US 7,490,525 B2
(45) Date of Patent: Feb. 17, 2009

(54) TESTING DEVICE FOR EVALUATING PERFORMANCE OF CLOSURE OF A VEHICLE DOOR AND TESTING METHOD

(75) Inventors: Tsutomu Tanaka, Kanagawa (JP); Masahiro Yamada, Mishima (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 262 days.

(21) Appl. No.: 11/289,549

(22) Filed: Nov. 30, 2005

(65) Prior Publication Data
US 2006/0123932 A1 Jun. 15, 2006

(30) Foreign Application Priority Data
Dec. 10, 2004 (JP) ............... 2004-358317

(51) Int. Cl.
*G01M 19/00* (2006.01)
(52) U.S. Cl. .................................... 73/865.3
(58) Field of Classification Search ............. None
See application file for complete search history.

(56) References Cited

U.S. PATENT DOCUMENTS

| | | | | |
|---|---|---|---|---|
| 4,827,415 A | * | 5/1989 | Gudat et al. | 701/49 |
| 6,062,079 A | * | 5/2000 | Stewart | 73/488 |
| 6,407,660 B1 | * | 6/2002 | Bomya | 340/436 |
| 2004/0099069 A1 | * | 5/2004 | Osentoski | 73/865.3 |
| 2004/0267425 A1 | * | 12/2004 | Suzuki et al. | 701/49 |
| 2005/0088135 A1 | * | 4/2005 | Sato | 318/717 |

FOREIGN PATENT DOCUMENTS

| | | |
|---|---|---|
| JP | 2001-354177 A | 12/2001 |
| JP | 2004-058990 A | 2/2004 |
| JP | 2005-059724 A | 3/2005 |

* cited by examiner

*Primary Examiner*—Robert R Raevis
(74) *Attorney, Agent, or Firm*—Foley & Lardner LLP

(57) ABSTRACT

A testing device for evaluating performance of closure of a vehicle door has a speed calculating part for calculating a speed of the door during the motion of the door relative to the main body of a vehicle, an analyzing part for analyzing behavior of the door by processing the speed changing in consequence of the closing motion of the door, and a judging part for judging the state of closure of the door based on the result of analysis obtained by the analyzing part.

18 Claims, 17 Drawing Sheets

10

Fig.12
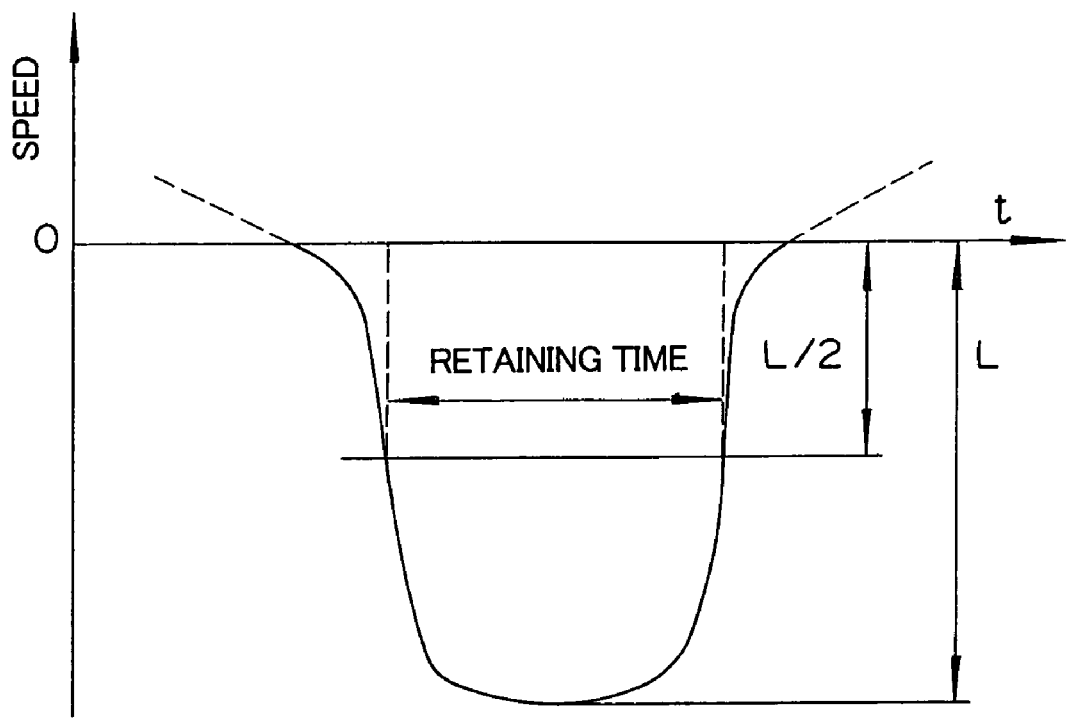
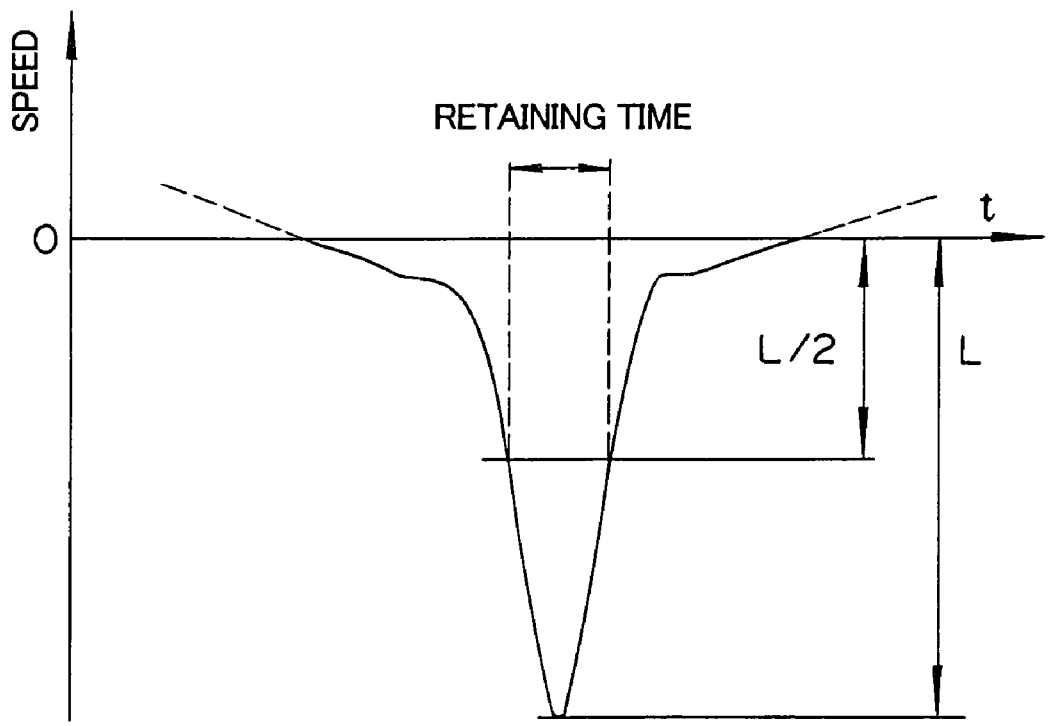

TESTING DEVICE FOR EVALUATING PERFORMANCE OF CLOSURE OF A VEHICLE DOOR AND TESTING METHOD

BACKGROUND OF THE INVENTION

1. Field of the Invention

This invention relates to a door testing device for evaluating performance of closure of a vehicle door and a method for testing the door.

2. Description of Related Art

As a means heretofore used for evaluating performance of closure of a vehicle door, a technique has been known (refer to Japanese Patent Application No. 2001-354177A). The technique uses a pair of parts subject to detection attached to an outer peripheral part of a door through a door side moving member, and an optical detector attached to a main body of the vehicle through a body side fixed member. In the technique detects a state of improper closure of the door based on the speed of obstruction of light in the optical detector and the difference of timing.

The conventional technique mentioned above judges that the door is completely closed when the pair of parts subject to detection both obstruct light in the optical detector. In contrast, the conventional technique judges that the door is in an improperly closed state when only one of the pair of parts subject to detection obstructs light in the optical detector.

The technique disclosed in the Patent Application mentioned above, however, has entailed the problem that the adjustment of the positions of the parts subject to detection and the detector requires a long time and the time spent in preparing the device for the test tends to elongate. Further, depending on the accuracy of the adjustment of the positions of the parts subject to detection and the detector, the possibility that the error of the measured value of the speed of closing a door is increased and the improperly closed state of a door can not be detected will arise.

SUMMARY OF THE INVENTION

This invention has been initiated with a view to solving the problem mentioned above. This invention, therefore, has for an object thereof the provision of a door testing device capable of accurately judging whether a closed door is in a state of improper closure or not and a method for effecting the judgment.

According to one aspect of the invention, a testing device for evaluating performance of closure of a door has a speed calculating part for calculating a speed of a vehicle door when the door moves relative to a main body of a vehicle, an analyzing part for analyzing the behavior of the door by processing the speed changing inconsequence of the door's closing motion, and a judging part for judging a state of closure of the door based on a result of analysis obtained by the analyzing part.

According to another aspect of the invention, a testing method for evaluating performance of closure of a vehicle door has a step of calculating a speed of a door when the door moves relative to a main body of a vehicle, a step of analyzing behavior of the door by processing the speed changing in consequence of the door's closing motion, and a step of judging a state of closure of the door based on the result of analysis.

Since this invention calculates the speed of a door when the door moves, analyzes the behavior of the door by processing the speed changing in consequence of the door's closing motion, and judges the state of closure of the door based on the result of the analysis, it can accurately judge the state of closure of the door while it curtails the time spent in preparing the device for the test.

BRIEF DESCRIPTION OF THE DRAWINGS

FIG. 12 is a diagram aiding the explanation of the outline of the second example of the processing of analysis in Step S110 shown in FIG. 6.

DESCRIPTION OF THE PREFERRED EMBODIMENT

Now, the preferred embodiment of this invention will be explained below with reference to the drawings annexed hereto.

Figure 1:
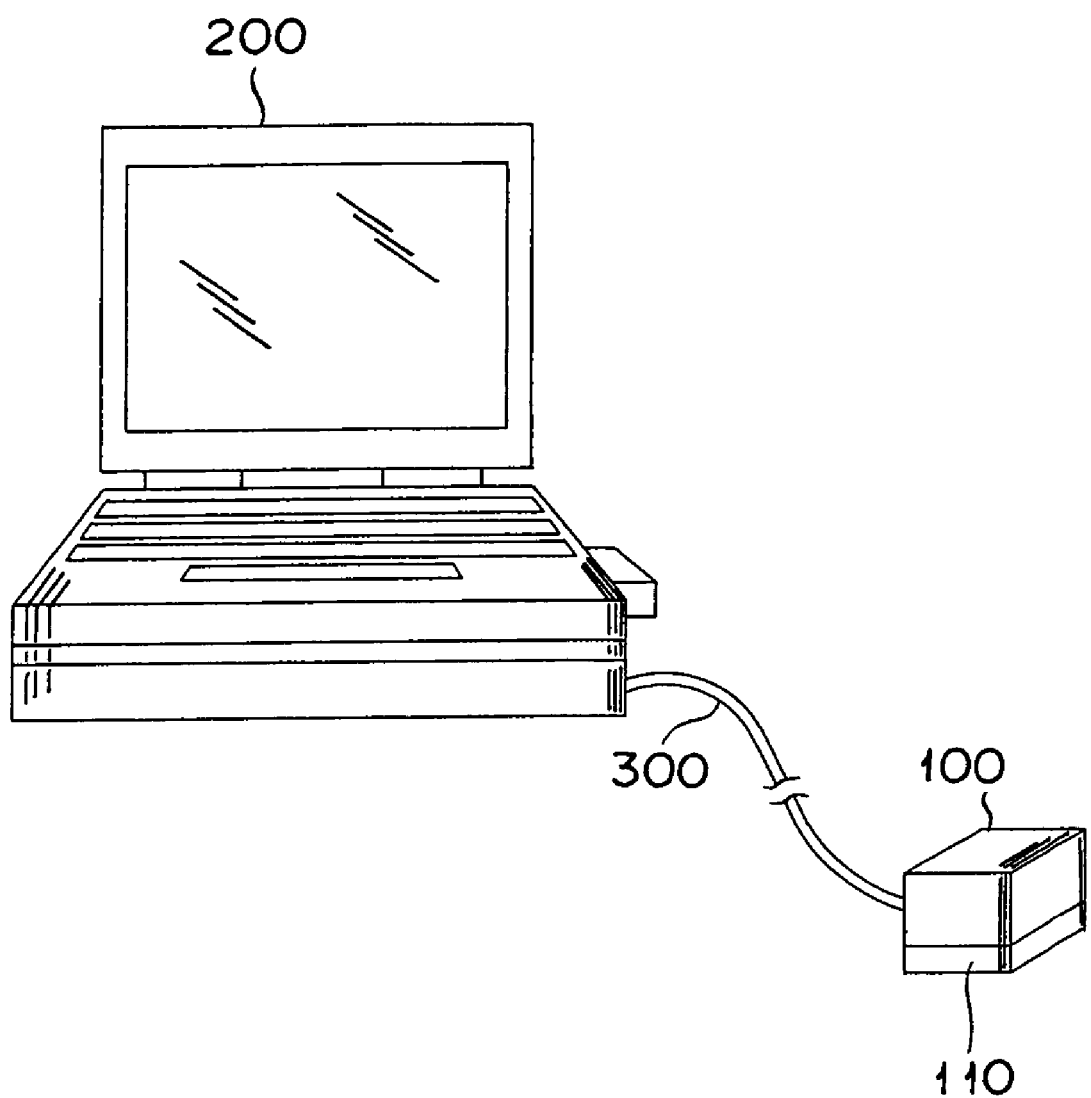
FIG. 1 is a diagram schematically illustrating a door testing device of an embodiment of this invention.

FIG. 1 schematically illustrates a door testing device of an embodiment of this invention. This testing device 10 evaluates performance of closure of a slide door which translationally moves relative to a main body of a vehicle.

The testing device 10 as shown in FIG. 1 has an acceleration sensor 100 for measuring an acceleration of the slide door and a computer 200 (hereinafter referred to as "PC") connected to the acceleration sensor 100.

The acceleration sensor 100 is attached to the slide door of a vehicle and operated to measure the acceleration of the slide door while the slide door is translationally moving. The acceleration sensor 100 corresponds to an acceleration measuring part. As the acceleration sensor 100, various kinds of sensors such as a semiconductor acceleration sensor, a piezoelectric type acceleration sensor, a strain gauge type acceleration sensor, and a servo type acceleration sensor are available.

Since the structure of the acceleration sensor 100 is similar to a structure of a conventional acceleration sensor, a detailed explanation thereof will be omitted.

The acceleration sensor 100 is preferred to have a magnet 110 attached to at least one surface thereof. In this case, the acceleration sensor 100 is removably attached to an outside plate of the slide door by dint of the magnetic force of the magnet 110. Unlike the this embodiment, the acceleration sensor 100 may be provided with a fitting part other than the magnet 110 such as a suction disc. In this case, the acceleration sensor 100 is removably attached to the outside plate of the slide door by dint of the suction disc.

Meanwhile, the PC 200 calculates a speed of the slide door being closed by using the measured data of the acceleration received via a cable 300 from the acceleration sensor 100, analyzes behavior of the slide door by processing the speed of the slide door, and judges the state of closure of the closed slide door based on a result of analysis. The PC as well extracts the speed of the slide door while it is passing through a prescribed interval (average speed in the prescribed interval) The PC 200 evaluates the performance of closure of the door based on the state of closure of the slide door and the extracted speed.

The expression "evaluate the performance of closure of a door" as used herein means judging whether or not a closed door has assumed a state of complete closure (hereinafter referred to as "the state of complete closure") instead of a state of improper closure in a closing motion of the door at the predetermined speed range. In other words, the expression "the performance of closure of a door" corresponds to a speed level which is required for a closed door to assume the state of complete closure. Naturally, the performance of closure of a door is exalted in accordance as the required speed level is lowered.

Figure 2:
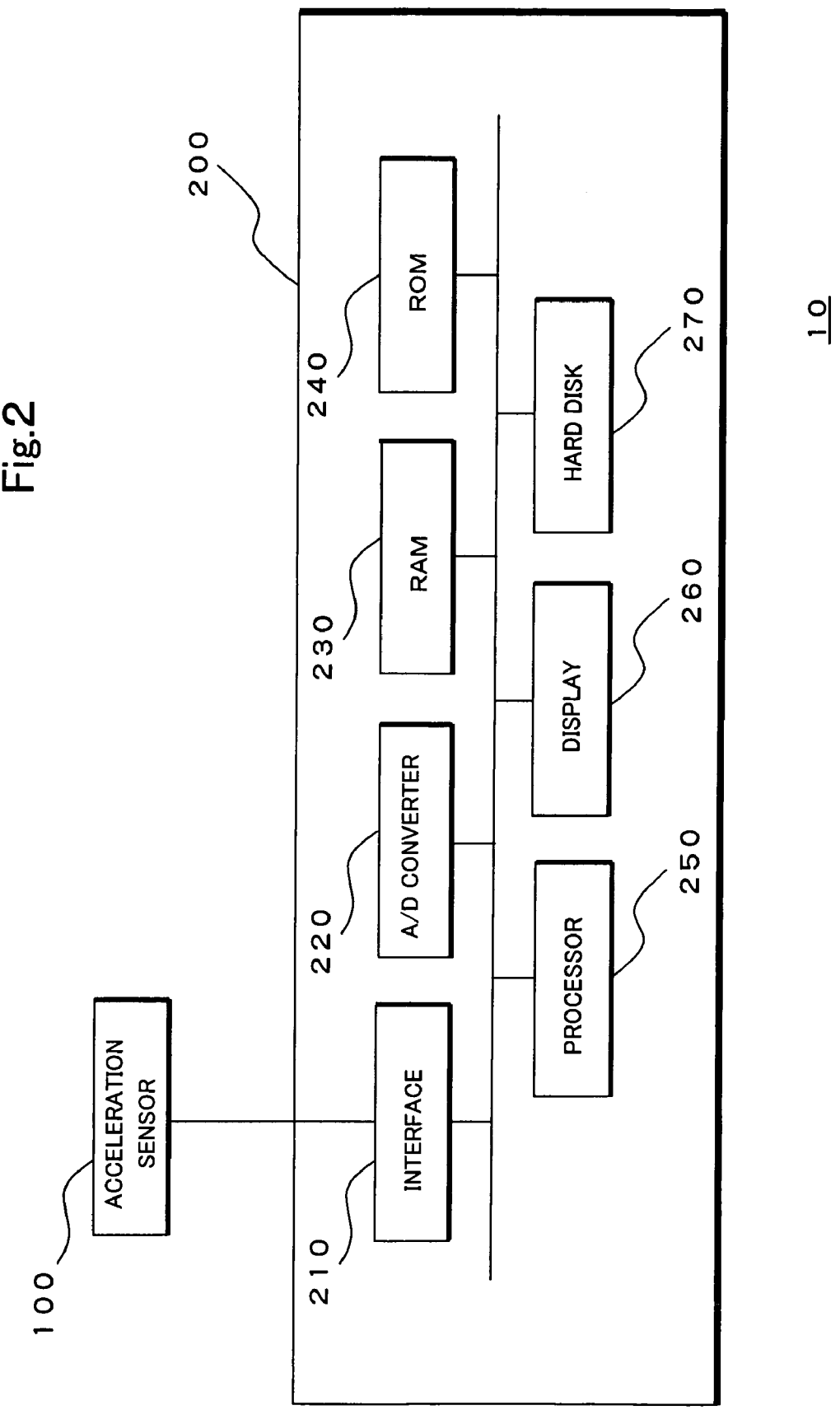
FIG. 2 is a block diagram schematically illustrating a structure of the door testing device shown in FIG. 1.
Figure 3:
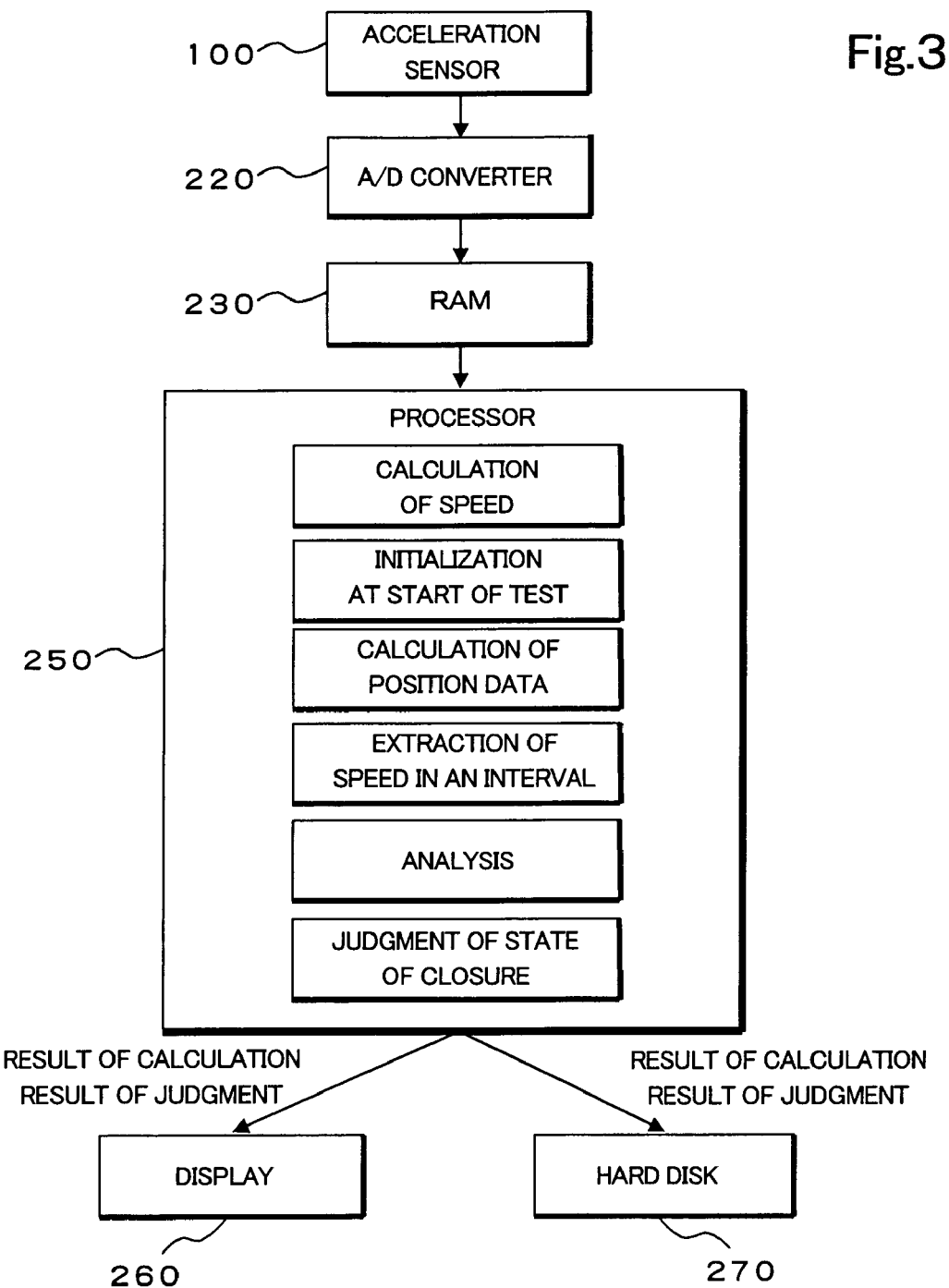
FIG. 3 is a data flow diagram illustrating a flow of data inside the door testing device shown in FIG. 1.

FIG. 2 is a block diagram schematically illustrating the structure of the testing device 10 and FIG. 3 is a diagram illustrating a flow of data inside the testing device 10. Now, the structure of the testing device 10 will be explained blow with reference to FIG. 2 and FIG. 3.

The PC 200 as shown in FIG. 2, is provided with an interface 210, an A/D converter 220, a RAM 230, a ROM 240, a processor 250, a display 260, and a hard disk 270. When the acceleration sensor 100 is furnished with the function of an A/D converter, the PC 200 naturally is not required to be provided with the A/D converter.

The interface 210 is a receiving part which electrically connects the PC 200 and the acceleration sensor 100 and receives the measured data of acceleration acquired by the acceleration sensor 100.

The A/D converter 220 is, for example, an ADC card, namely a converter which converts the measured data of acceleration received via the interface 210 from analog data to digital data. The RAM 230 is a memory for temporarily memorizing the measured data of acceleration which have been converted into the digital data and also functions as a working area when the speed is calculated by subjecting the measured data of acceleration to time integration and the behavior of the door is analyzed by processing the calculated speed. The ROM 240 is a memory for memorizing the control program and the parameter in advance.

The processor 250 executes various operations and controls. The processor 250 takes charge of calculating the speed of the slide door, initializing at the time of starting the test, calculating a position data of the slide door, extracting the speed in a prescribed interval, performing analysis, judging improper closure of a door, and evaluating the performance of closure of the door. More specifically, the processor 250 functions as a speed calculating part, an analyzing part, a judging part, a continuous time judging part, an initializing part, a door position calculating part, an extracting part, and an evaluating part.

Here, the speed calculating part calculates the speed of the slide door when the slide door moves translationally. The analyzing part analyzes the behavior of the slide door by processing the speed (speed waveform) which changes in consequence with the closing motion of the door. The judging part judges a state of closure of the closed slide door based on a result of analysis acquired by the analyzing part. The continuous time judging part judges whether or not a time in which the speed in the direction opposite the direction of closure of the slide door continues is longer than the prescribed time (hereinafter referred to as "the first prescribed time t1"). The initializing part executes initialization of the device 10 for the purpose of judging the state of closure of the door when the time in which the speed in the opposite direction continues is judged to be longer then the first prescribed time t1. The door position calculating part calculates a position data concerning the position of the slide door by subjecting the speed calculated by the speed calculating part to time integration. The extracting part extracts the speed at which the slide door passes a prescribed interval preceding a curved part (which will be described specifically herein below) of a rail guiding the slide door toward an inner side of a vehicle body during the closure of the slide door based on the position data. The evaluating part evaluates the performance of closure of the slide door based on the state of closure of door judged by the judging part and the speed extracted by the extracting part. The details of the contents of processing performed by the processor 250 are illustrated in the flow chart which will be described specifically herein below.

The display 260 functions as a display part for displaying the result of processing performed by the processor 250. The result of the processing includes, for example, at least one of the result of the judgment as to whether or not the slide door is in the state of improper closure, the value of the speed of the slide door calculated, and the result of evaluation of the performance of closure of the door. The hard disk 270 functions as a recording part for recording the results of processing mentioned above as a data file. The hard disk 270 as well functions to store computer program to be executed by the processor 250.

The flow of data in the testing device 10 which is constructed as described above is shown in FIG. 3. The acceleration sensor 100 measures the acceleration of the slide door while the slide door is in the course of translational motion. The A/D converter 220 converts the measured data of this acceleration into digital data and the measured data of acceleration converted into the digital data are temporarily stored in the RAM (memory) 230.

Then, the processor 250 calculates the speed of the slide door by subjecting the memorized acceleration to time integration. The processor 250 as well executes the initialization of the time for starting the test properly. Further, the processor 250 calculates the position data regarding the position of the slide door by subjecting the calculated speed of the slide door to time integration. Then, the processor 250 extracts the speed at which the slide door passes the prescribed interval based on the calculated position data of the slide door.

The processor 250 further processes the speed of the slide door changing in consequence of the closing motion of the door (inclusive of the case of further processing the position data of the slide door obtained by processing the speed) and analyzes the behavior of the slide door. Then, the processor 250 judges the state of closure of the slide door based on the result of the analysis.

Figure 4:
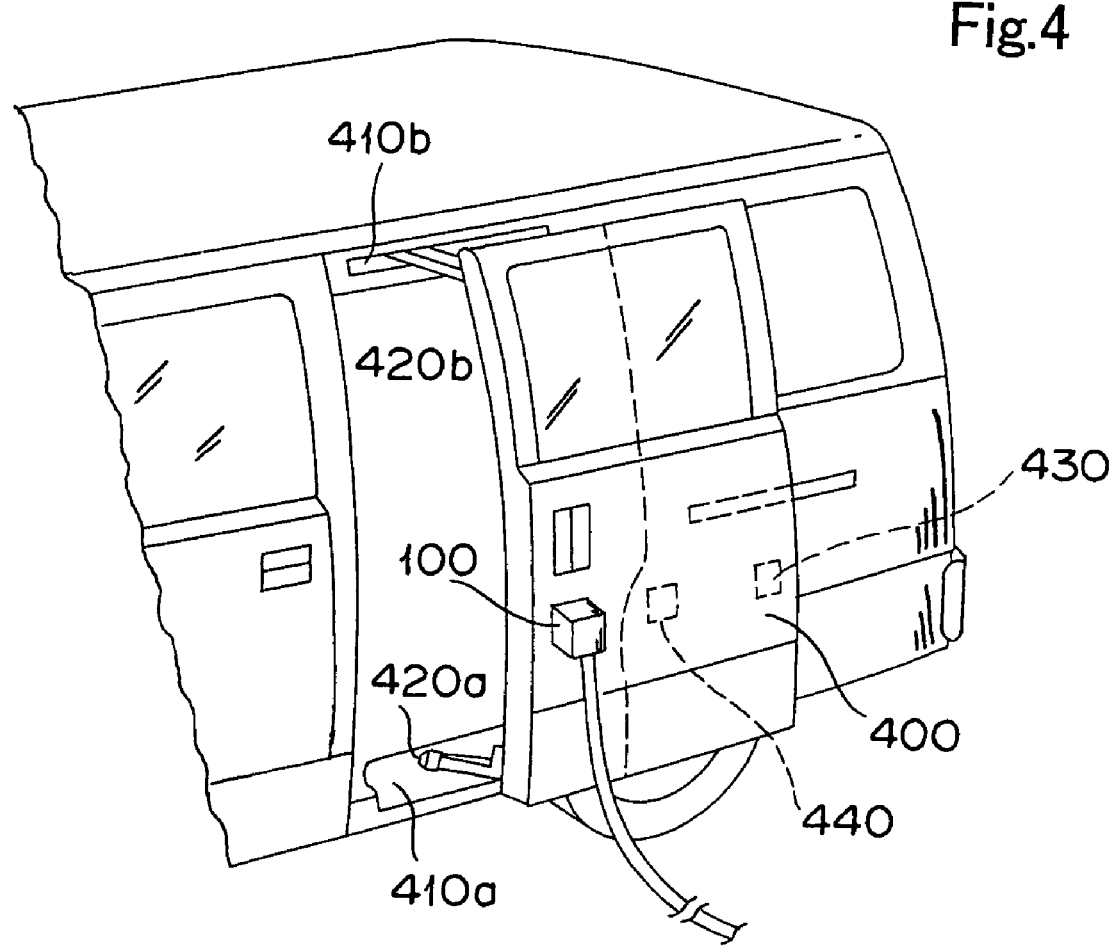
FIG. 4 is a diagram aiding an explanation of a state of an attachment of an acceleration sensor included in the door testing device shown in FIG. 1 to a slide type door of a vehicle.

FIG. 4 is a diagram aiding the explanation of a state of attachment of the acceleration sensor 100 to the slide door of a vehicle. The acceleration sensor 100 in the present embodiment can be mounted at an arbitrary position. Preferably, however, the acceleration sensor 100 is attached to the part of high rigidity of the outer plate of the slide door 400 such as, for example, the neighborhood of the handle part of the slide door 400.

The slide door 400 of a vehicle which is subject to a test is translationally moved relative to the main body of the vehicle. Door rails 410a and 410b are installed on the vehicle's main body side and roller parts 420a and 420b are installed on the slide door 400 side. Inconsequence of an opening or closing motion of the slide door 400, the roller parts 420a and 420b are moved on the door rails and are made to guide the slide door 400. The slide door 400 is preferably provided with a door locking mechanism 430. When the slide door 400 has been completely closed, for example, the slide door 400 is locked by the mesh formed between the door locking mechanism 430 and a striker 440 disposed on the vehicle's main body side.

Figure 5:
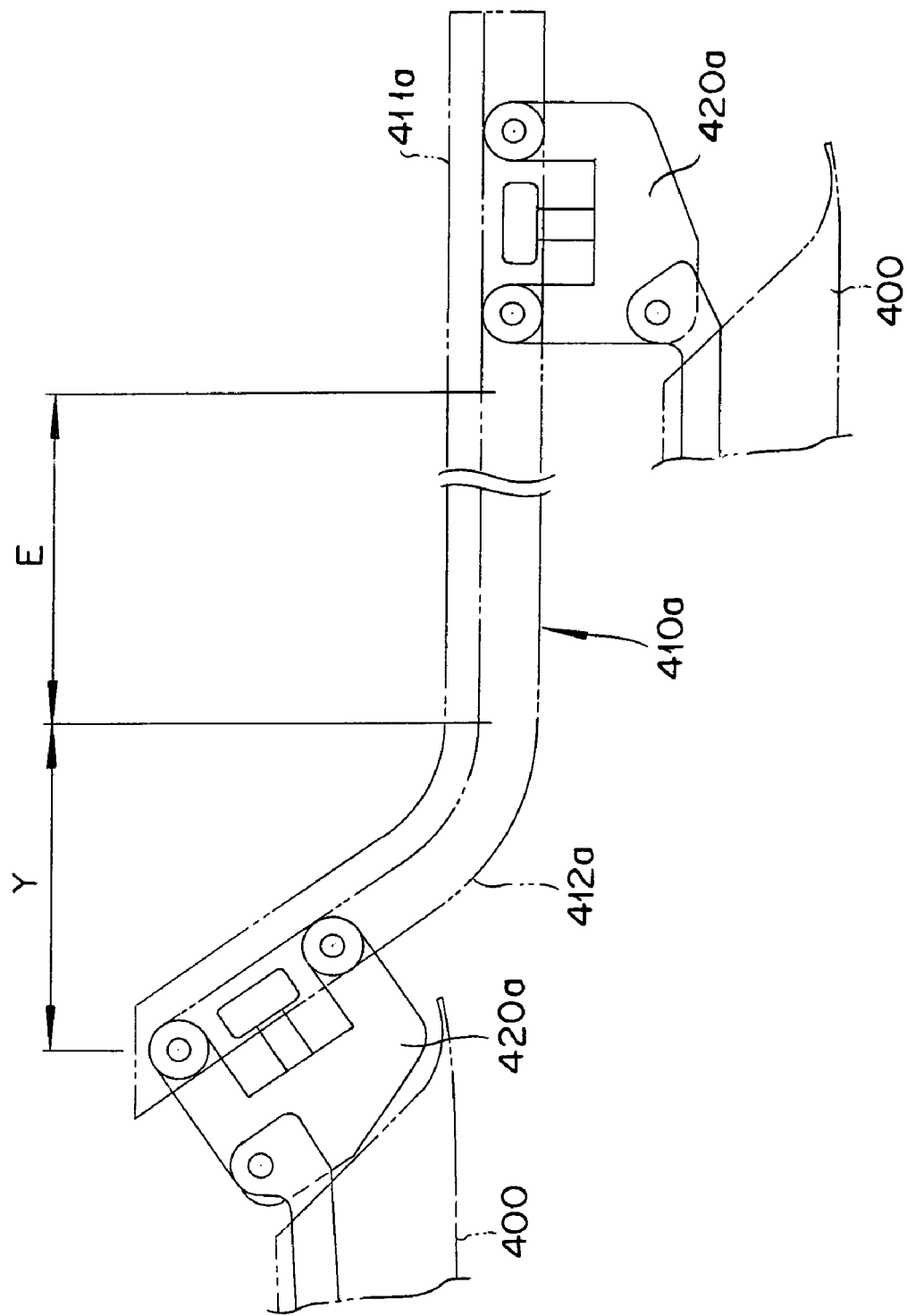
FIG. 5 is a magnified diagram of a door rail and a roller part shown in FIG. 4.

FIG. 5 is a magnified diagram of the door rails and the roller parts. In FIG. 5, the door rail 410a on the lower side is depicted. The door rail 410b on the upper side has the same structure.

The door rail 410a is furnished with a straight line part 411a extending on a straight line along the main body of the vehicle and a rail curved part 412a connected to one end of the straight line part 411a. The rail curved part 412a is a leading-in part for guiding the slide door 400 in the direction of the interior of a vehicle body during the closure of the slide door 400. The distance from the position of complete closure of the door rail 410a to the boundary point between a curved part 412a and a straight line part 411a is called a "Y distance (indicated by "Y" in the diagram). This Y distance has been input in advance and a prescribed interval E which precedes the rail curved part 412a guiding the slide door 400 in the direction of the interior of the vehicle body is specified in accordance with the Y distance. As the prescribed interval E, for example, the interval from the boundary point between the curved part 412a and the straight line part 411a to the straight line 411 preceding the boundary point by 100 mm is specified. The speed of the slide door at which the slide door 400 passes this interval is extracted as the speed subject to evaluation. Finally, the performance of closure of the door can be automatically evaluated based on the speed extracted for evaluation and the result of the judgment of the state of improper closure of the door.

Figure 6:
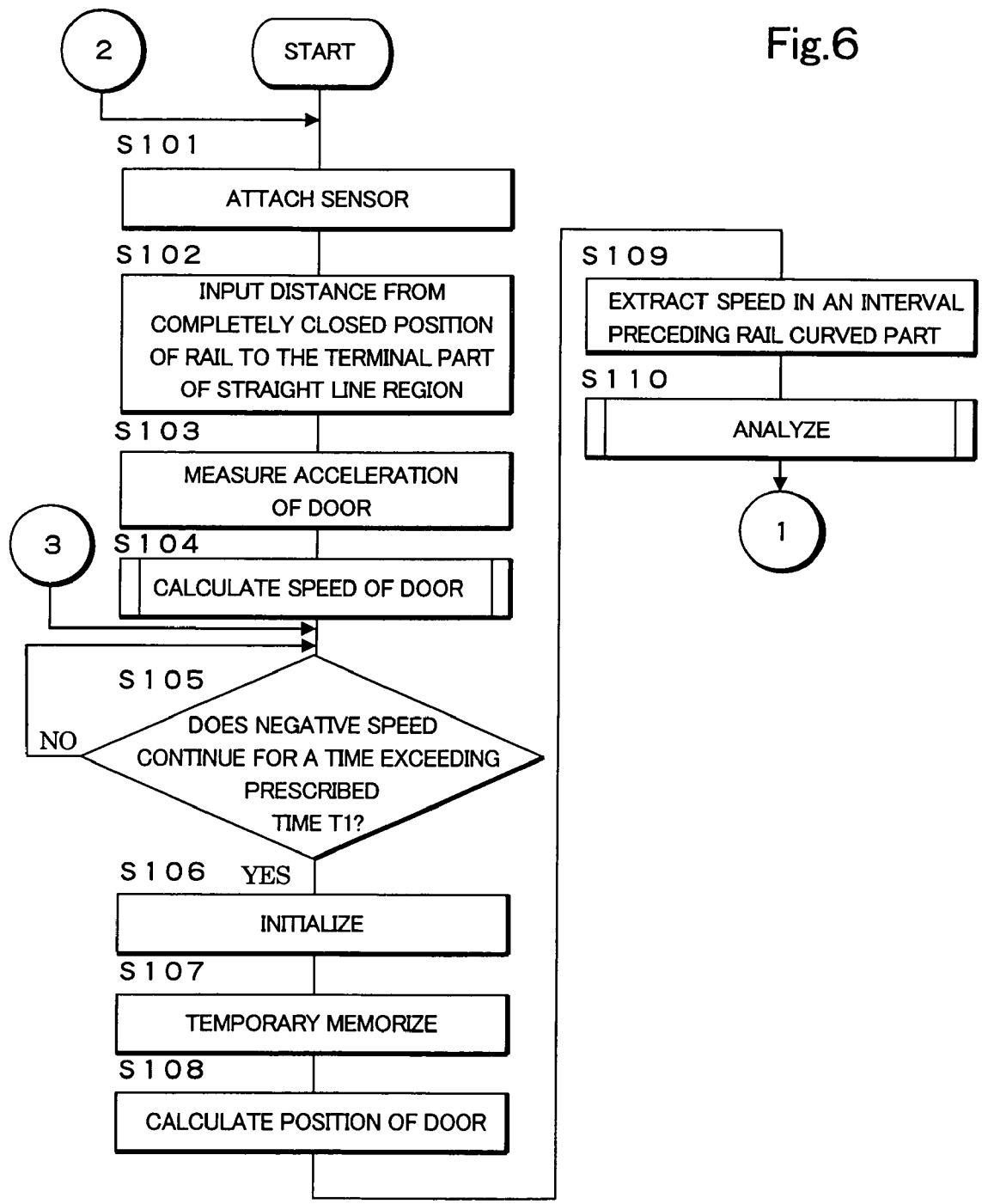
FIG. 6 is a flowchart illustrating one example of a procedure by the door testing device shown in FIG. 1.
Figure 7:
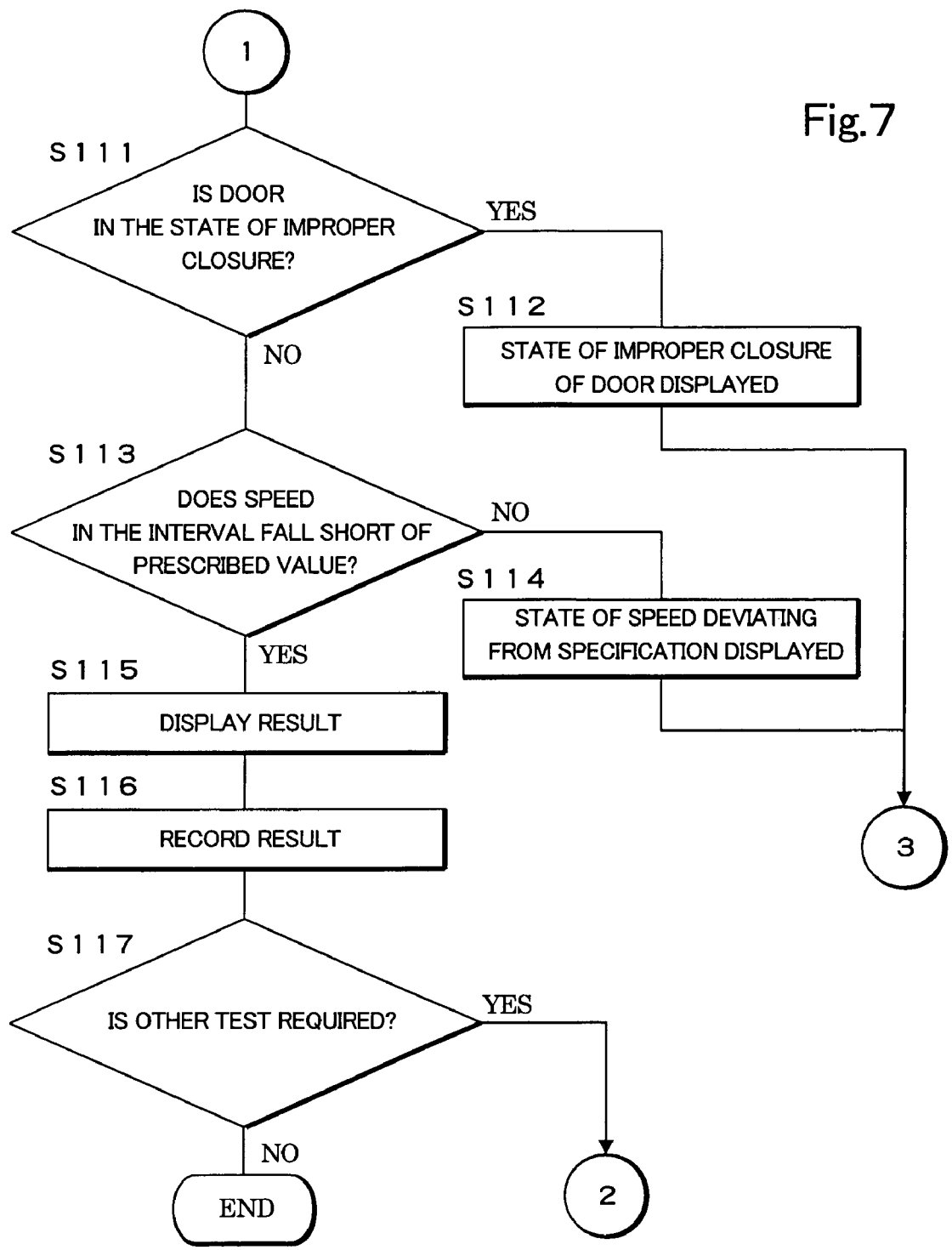
FIG. 7 is a flowchart illustrating one example of a procedure which continues from the diagram of FIG. 6.
Figure 8:
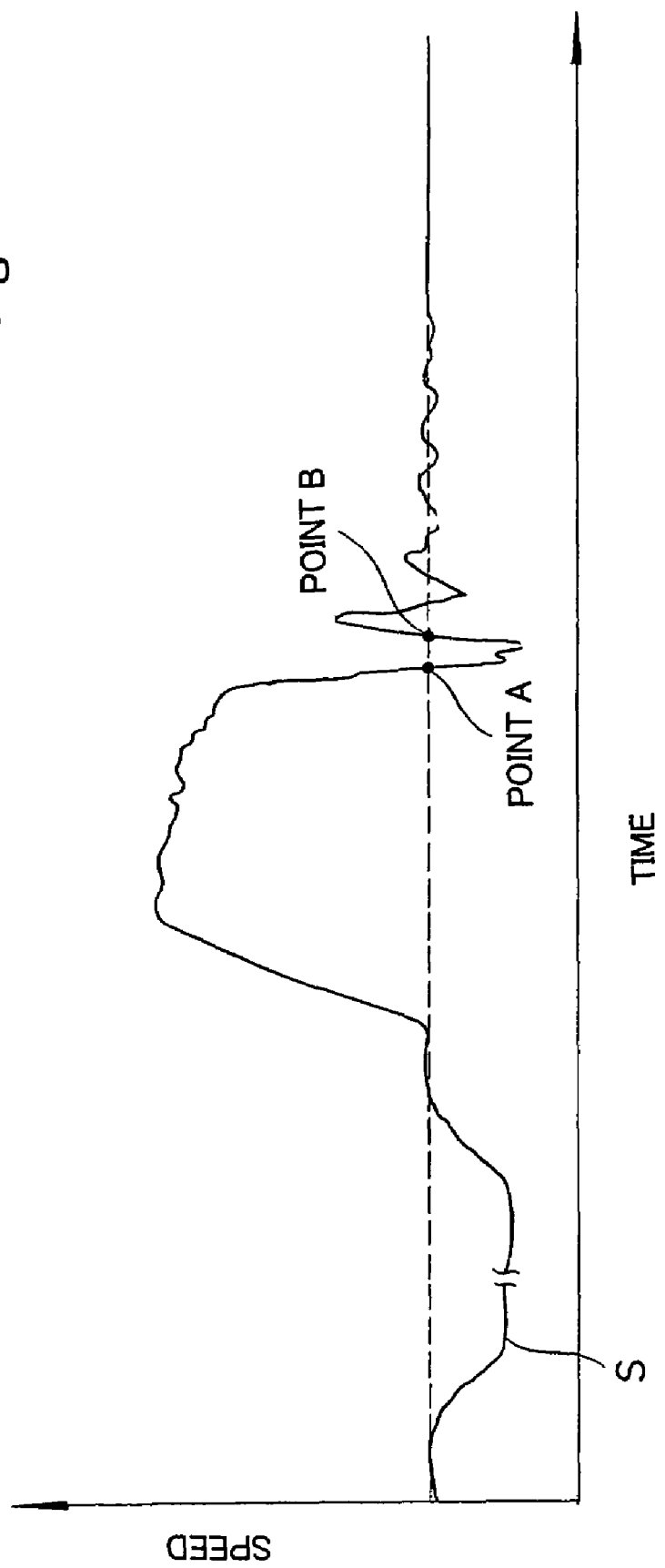
FIG. 8 is a diagram showing the change of the speed measured from the time the door is opened till the time the door is closed.

Now, the procedure for processing the testing device 10 constructed as described above will be explained below. FIG. 6 and FIG. 7 jointly form a flow chart showing the procedure for processing the testing device 10 in the present embodiment. FIG. 8 is a diagram showing the changes of speed (speed waveform) at various points from the time the slide door 400 is opened till the time it is closed.

First, the acceleration sensor 100 is attached to the slide door 400 (step S101). To be specific, the acceleration sensor 100 is removably attached to the outer plate of the slide door 400 by dint of the magnetic force of the magnet 110 disposed on the back of the acceleration sensor 100.

Then, the aforementioned Y distance, namely the distance from the position of complete closure of the door rail 410a to the boundary point (the terminal part of the straight line part 411a) between the curved part 412a and the straight line part 411a is input (step S102). The adoption of the construction which allows the Y distance to be input results in rendering the testing device of this invention applicable to a plurality of vehicles having severally different Y distances and exalting the flexibility of the testing device.

Then, the processing for the evaluation of the actual closure of the door is executed. First, the acceleration sensor 100 measures the acceleration of the slide door 400 during the translational motion of the slide door 400 (step S103). The acceleration sensor 100 successively measures the acceleration of the slide door 400 in the direction of the translational motion. The measured data of the acceleration are transmitted via the cable 300 to the PC 200. The measured data of the acceleration are converted from analog data to digital data. The RAM 230 temporarily memorizes the measured data of the acceleration in time series. In the present embodiment, the acceleration sensor 100 uniaxial in structure which measures only the acceleration in the direction of translational motion of the slide door 400 may be used from the viewpoint of simplifying the device. It is, however, permissible to use the acceleration sensor which is capable of measuring the acceleration in all of the three axes.

Then, the speed of the slide door 400 is calculated by subjecting the acceleration measured by the acceleration sensor 100 to time integration (step S104). The processing of integration from two directions of data can be adopted when the speed is calculated by subjecting the acceleration to time integration. The contents of the processing of integration from the two directions of data will be described specifically herein after.

Then, the question as to whether or not the state of starting the test (standby state) has matured is judged based on the speed calculated at the step S104. When the test is started, the operator opens the slide door 400 once and subsequently pushes the slide door 400 so as to close it. Let the direction of closing the slide door be the positive direction, and the state in which the speed manifests a negative value will continue comparatively long while the slide door is in a closing motion (refer to the S region in FIG. 8). At the step S105, therefore, the question as to whether or not the time in which the speed manifesting a negative value (namely, the speed in the direction opposite the direction of closing the slide door) continues is longer than the first prescribed time t1 is judged. When the time in which the speed showing a negative value continues is longer than the first prescribed time t1 (the step S105: YES), the slide door 400 is judged to be in the state for starting the test and the initialization of the device 10 is executed for judging anew the state of closure of the door (the step S106). When the calculated speed shows a negative value over a duration exceeding the first prescribed time (such as, for example, 0.3 second), the processor 250 judges that the slide door 400 has assumed the state for starting the test and executes the processing of initialization.

Even after the processing of initialization, the acceleration during the course of the closure of the door is sequentially measured, the speed of the slide door 400 is calculated by subjecting the acceleration measured by the acceleration sensor 100 to time integration, and the speeds calculated at various points are temporarily memorized in time series (the step S107). That is, the speeds at the various times t are temporarily memorized.

Then, the position data concerning the position of the slide door 400 are calculated by further subjecting the calculated speeds to time integration (the step S108). Naturally, various methods of numerical integration can be used for the time integration.

Then, the speed at which the slide door 400 passes the prescribed interval E (refer to FIG. 5) preceding the rail curved part 412a guiding the slide door 400 toward the interior of the vehicle body during the closure of the slide door 400 is extracted based on the position data so calculated (the step S109). For example, the interval from the boundary point between the curved part 412a and the straight line part 411a to the straight line part 411a preceding the boundary point by 100 mm is specified by comparing the Y distance input at the step S102 and the position data calculated at the step S108. Then, the average speed at which the slide door 400 passes this interval is extracted from among the speeds at the varying points temporarily memorized at the step S107. The average speed thus extracted constitutes the speed subject to evaluation. The prescribed distance which is used in the measurement of the average speed of the door 400 does not need to be limited to 100 mm. The operator is allowed to designate this prescribed distance in advance.

Then, the processor 250 analyzes the behavior of the slide door 400 by processing the speed changing in consequence of the closing motion of the door (the step S110). The analysis may be executed based on the speed or based on the position data of the slide door obtained by further integrating the speed. The contents of each of these analyses will be specifically described herein below.

When the analysis results in judging the closed door 400 to be in the state of improper closure (the step S111 in FIG. 7: YES), a remark designating the state of improper closure of the door is shown in the display 260 (the step of S112). The operator, on noticing the remark to the effect that the slide door 400 is in the state of improper closure, performs the operation of closing the door all over again. Owing to the fact that the slide door 400 once closed is opened again by the operator, the state in which the time in which the speed showing a negative value continues is longer than the first prescribed time (the step S105: YES) and the processing including and following the step S106 is executed again.

When the closed slide door 400 is judged to be not in the state of improper closure (the step S111: NO), the processor 250 judges whether or not the speed subject to evaluation which has been extracted at the step S109 is not more than the specified value (the step S113). That is, this processing step takes into consideration the fact that when the slide door 400 is strongly closed at a speed exceeding the prescribed value, the significance of the test is lost because the slide door 400, if deficient in performance of closure of door, does not assume the state of improper closure. The specified value is properly decided, depending on the internal specification of the performance of closure of door or the specification agreed with a customer. When the average speed of the slide door in the prescribed interval E is judged to exceed the specified value (the step S113: NO), the display 260 shows the remark to the effect that the speed deviates from the specification (the step S114). As a result, the operator knows the fact that the speed has deviated from the specification and is enabled to perform the work of closing the door all over again. Since the fact that the slide door 400 closed once is opened again by the operator induces the state in which the time of continuance of the speed showing a negative value is longer than the first prescribed time (the step S105: YES), the processing including and following the step S106 is executed again.

When the speed subject to evaluation is judged to be lower than the specified value (the step S113: YES), the display 260 shows the result therein (the step S115). That is, when the slide door 400 is closed at a speed within an appropriate range, it is confirmed that the closed slide door 400 does not assume the state of improper closure. As a result, the test for the evaluation of the performance of closure of door is terminated. The display 260 indicates the speed of the slide door 400 at the time that the state of complete closure is realized and indicates as well the fact that the performance of closure of door has won acceptance. Further, the results of individual calculations and the results of judgments are recorded in the hard disk 270 (the step S116).

Then, when other slide door awaits the test (the step S117: YES), the process returns to the step S101 shown in FIG. 6 and the subsequent process is executed again. When no other slide door awaits the test (the step S117: NO), the process is completed as it is.

In the preceding process, the step S104 of FIG. 6 corresponds to the process performed by the processor 250 as a speed calculating part, the step S105 corresponds to the process as a continued time judging part, and the step S106 corresponds to the process as an initiating part respectively. Likewise, the step S107 corresponds to the process as a door position calculating art and the step S108 corresponds to the process as an extracting part. Further, the step S111-the step S116 shown in FIG. 7 correspond to the evaluating part for evaluating the performance of closure of the slide door 400 based on the state of closure of the slide door 400 judged by the judging part and the speed (the speed subject to evaluation) extracted by the extracting part.

The procedure of processing with the testing device 10 in the present embodiment has been explained. This procedure of processing may be properly changed.

Figure 9:
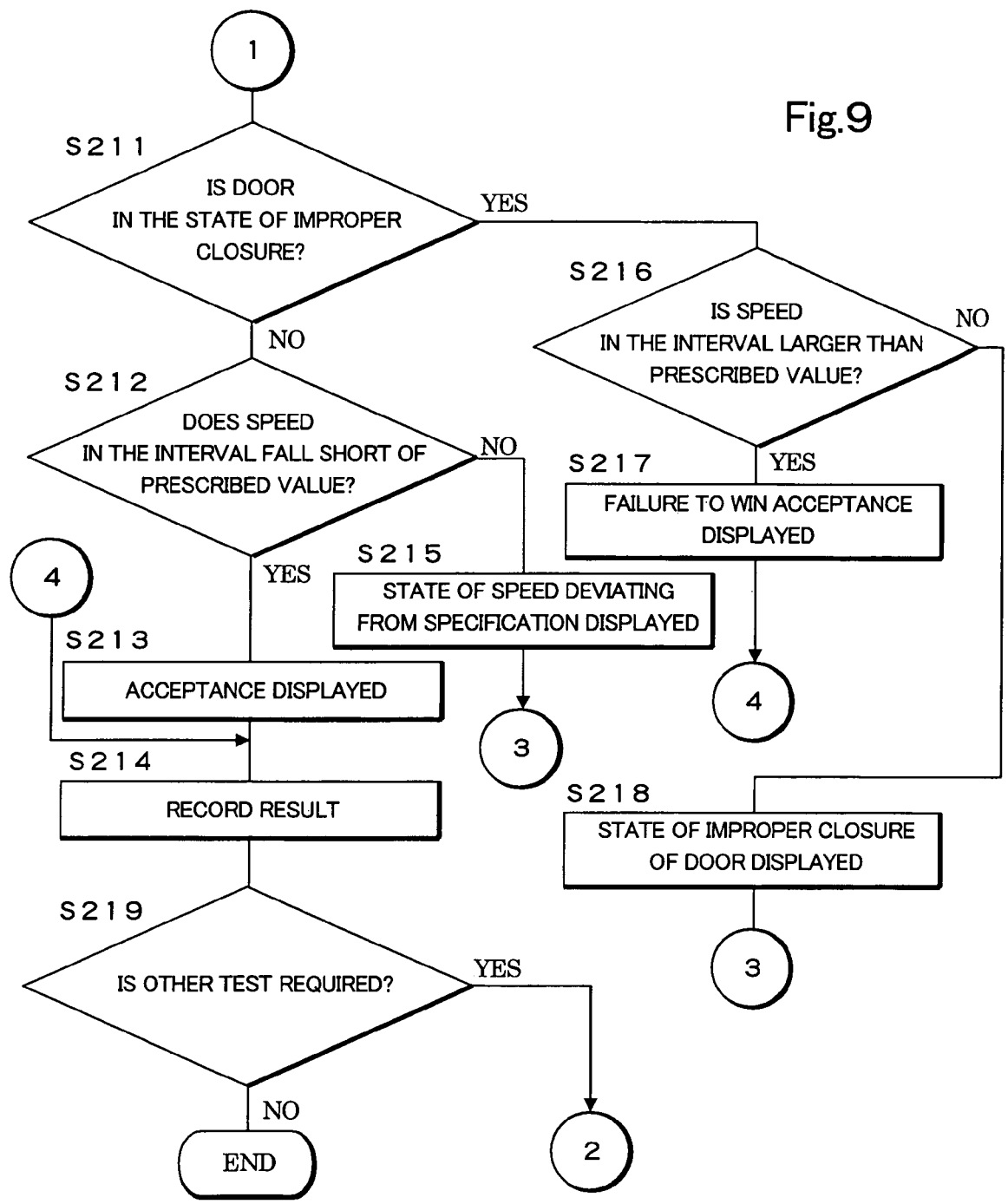
FIG. 9 is a flow chart illustrating a modified example of the procedure which continues from the diagram of FIG. 6.

FIG. 9 is a flow chart showing the procedure of processing with the testing device in a modified example. Since the testing device in the modified example carries out the same process as that of the step S101-step S110 shown in FIG. 6, the same process as that of the step S101-step 110 will be omitted from being explained again. FIG. 8, therefore, illustrates only the process which follows the same process as the step S110 shown in FIG. 6.

In the process of the step S211 which follows the same process as the step S110 shown in FIG. 6, when the closed slide door 400 is judged to be not in the state of improper closure based on the result of the analysis (the step S211: NO), the processor 250 judges whether or not the speed subject to evaluation which is the average speed of the slide door 400 in the aforementioned prescribed interval E is less than the specified value (the step S212). When the speed subject to evaluation is less than the specified value (the step S212: YES), the fact that the performance of closure of door has won acceptance is shown in the display 260 (the step S213) and the result of the calculation and the results of the judgment are recorded in the hard disk 270 (the step S214). When the speed subject to evaluation is greater than the specified value (the step S212: NO), the display 260 indicates the fact that the speed deviates from the specification (the step S215).

Even when the closed slide door 400 is judged to be in the state of improper closure (the step S211: YES), the question as to whether or not the speed subject to evaluation is larger than the specified value is judged (the step S216). As a result, when the slide door 400 assumes the state of improper closure notwithstanding the speed subject to evaluation is greater than the specified value (the step S216: YES), the fact that the performance of closure of door has failed to win acceptance is established. In this case, the fact that the performance of closure of door has failed to win acceptance is indicated in the display 260 (the step S217) and the result is recorded in the hard disk (the step S214). When the speed subject to evaluation falls short of the specified value (the step S216: NO), since the fact that the performance of closure of door has failed to win acceptance is not established, only the fact that the door is in the state of improper closure is indicated (the step S218).

Then, when other slide door 400 awaits the test (the step S219: YES), the process returns to the same process as the step S101 shown in FIG. 6 and the subsequent process is executed again. When no other slide door 400 awaits the test (the step S219: NO), the process is completed as it is.

In the present modified example shown in FIG. 9, the process from the step S211 to the step S218 corresponds to the evaluating part which evaluates the performance of closure of the slide door 40 based on the state of closure of the slide door 400 judged by the judging part and the speed extracted by the extracting part (the speed subject to evaluation). In accordance with this modified example, it is made possible to attain early detection of the slide door 400 whose performance of closure has failed to win acceptance and make due amendment thereon.

The procedure of processing with the testing device 10 in the present embodiment illustrated in FIG. 6 and FIG. 7 and the procedure of processing in the modified example illustrated in FIG. 9 have been explained. Now, the process of speed calculation shown in the step S104 of FIG. 6 and the process of analyzing shown in the step S110 of FIG. 6 will be described in detail below.

(Process of Integration from Two Directions of Data)

First, the process for calculating the speed shown in the step S104 of FIG. 6 will be explained below. In this embodiment, the process of integration from two directions of data is adopted with the object of allaying the influence of noise.

Figure 10:
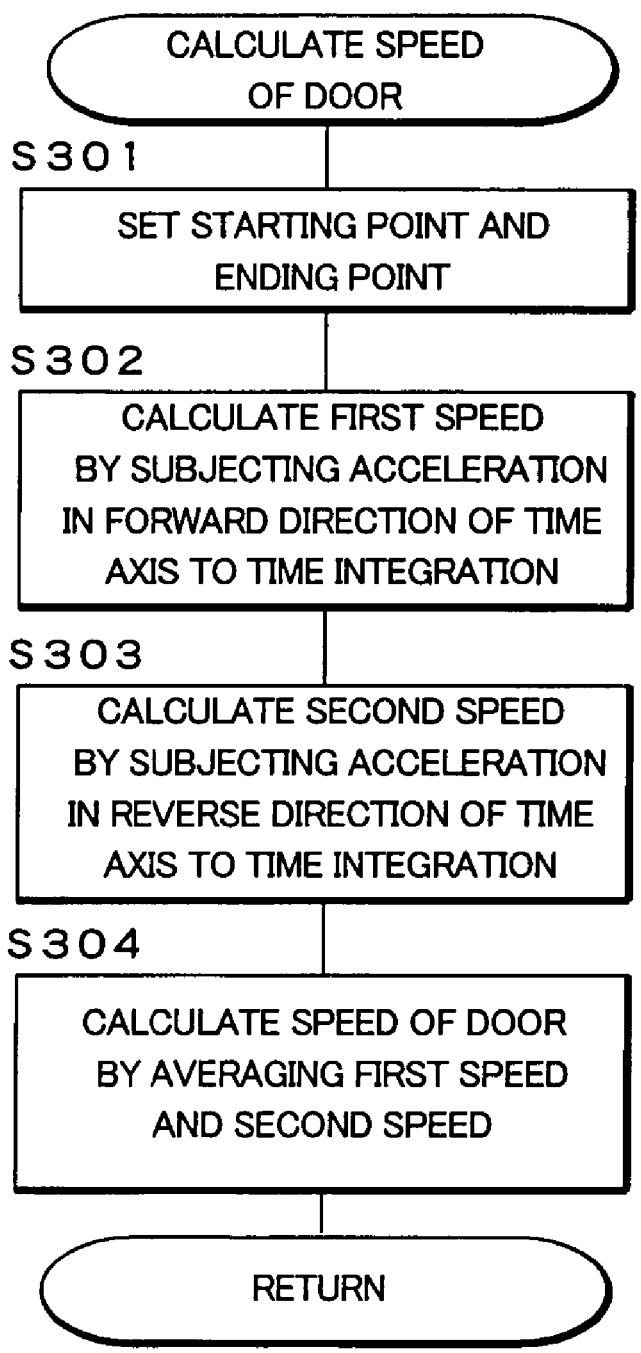
FIG. 10 is a flow chart illustrating a processing of speed calculation at Step S104 shown in FIG. 6.

FIG. 10 is a flow chart showing the contents of the process for calculating the speed and corresponds to the sub-routine of the step S104 of FIG. 6.

The processor 250 reads the values of acceleration measured at the individual points and stored temporarily in time series and sets the earliest time (hereinafter referred to as "the starting point") and the latest time (hereinafter referred to as "the last point") in the points corresponding to the range of analysis (the step S301). The range of analysis may be decided in advance.

Then, the processor 250 subjects the speed in the direction from the starting point to the last point mentioned above to time integration and calculate a first speed. That is, the first speed is calculated by subjecting the acceleration by subjecting to time integration the acceleration in the forward direction of the time axis with the starting point as 0 point (the step S302).

Then, the processor 250 calculates a second speed by subjecting to time integration the acceleration in the direction from the last point to the starting point. That is, conversely to the case of the step S302, the second speed is calculated by subjecting to time integration the acceleration in the reverse direction of the time axis with the last point as 0 point (the step S303).

Then, the processor 250 obtains the final speed by averaging the first speed calculated at the step S302 and the second speed calculated at the step S303 (the step S304).

As a result, it is made possible to reduce the error in the process of integration for the conversion of the acceleration to the speed and exalt the precision.

The reason for reducing the error by the process illustrated in FIG. 10 is as follows. More often than not, the measured value of acceleration may contain a noise. The noise at times occurs in the direction producing a larger value of acceleration than the actual value of acceleration and occurs in the direction of producing a lower value of acceleration than the actual value of acceleration. In many cases, it occurs as biased in either of these directions. When the acceleration is integrated toward one direction of the time axis, the deviation of the noise results in successively adding to the noise component and causing the calculation waveform of the speed to produce an unnecessary biased component. By effecting the process of integration from the two directions opposite the forward direction of the time axis and averaging the resultant accelerations in accordance with the process illustrated in FIG. 10, it is made possible to offset the unnecessary biased component and enhance the precision.

In the case of finding the speed in the prescribed interval E (the speed subject to evaluation) by actual measurement with a photoelectric detecting device to be 0.79 ms, for example, the process for integration from only one direction and the process for integration from two directions were compared in terms of error. The results of this comparison are shown below.

As a result of this experiment, the result of calculation of speed of 0.83 m/s including an error of +5% was obtained when the speed subject to estimation was calculated by the process of integration from only one direction and the result of calculation of speed of 0.77 m/s including an repressed error of −2.6% when the speed subject to estimation was calculated by the process of integration from two directions according to the present embodiment. These results indicate that the unnecessary bias component could be offset by performing the process of integration from two directions and averaging the two sets of the results.

(Process of Analysis)

Now, the process of analysis shown in the step S110 of FIG. 6 will be explained below. The process of analysis shown in the step S110 is aimed at processing the calculated speed, analyzing the behavior of the slide door, and judging the state of closure of the closed slide door 400 based on the result of the analysis. Though various methods are available for the process of analysis, three examples of the process of analysis (the first example of the process of analysis-the third example of the process of analysis) will be explained in the present embodiment.

(First Example of the Process of Analysis)

Figure 11:
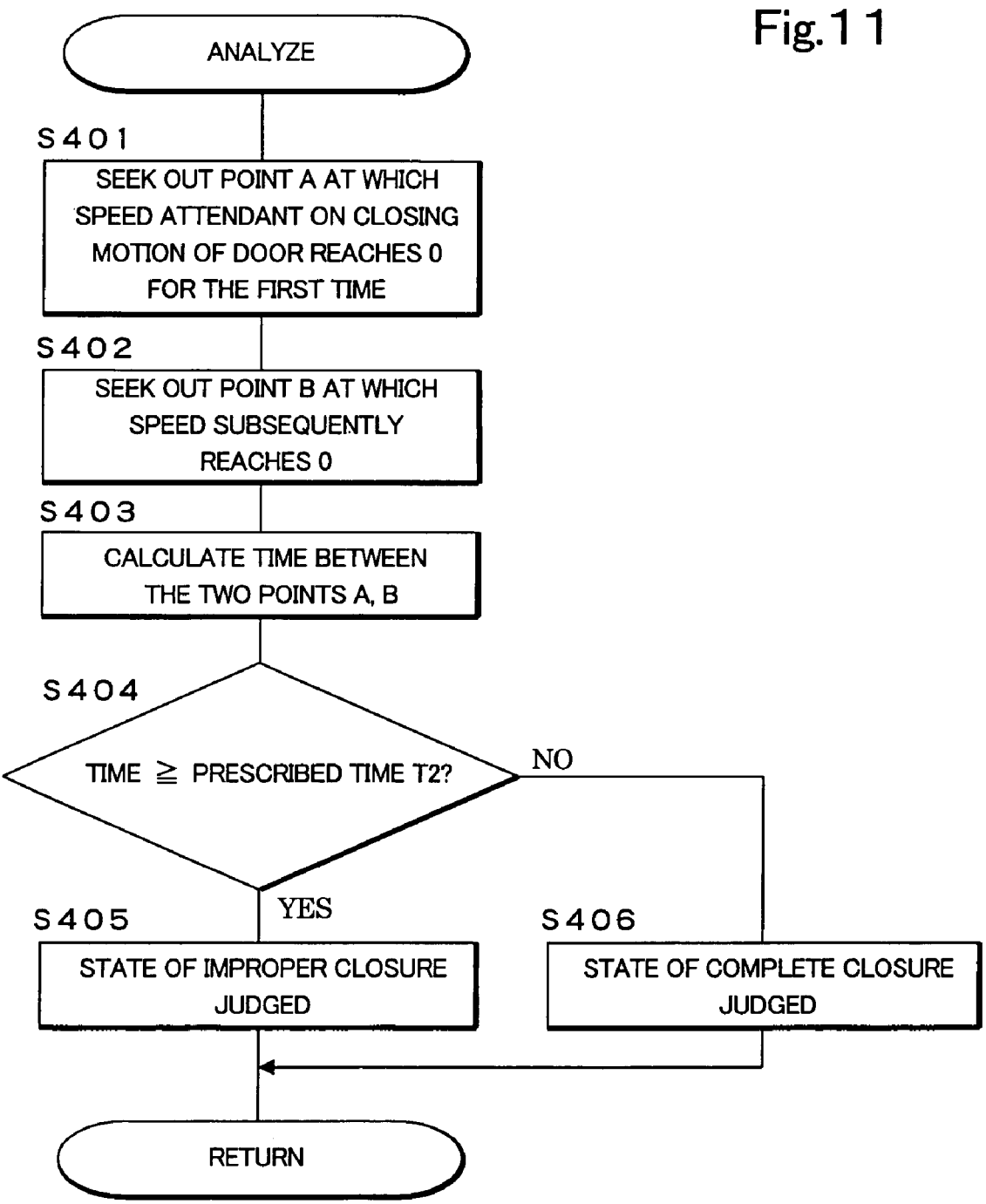
FIG. 11 is a flow chart illustrating the first example of a processing of analysis at Step S110 shown in FIG. 6.

FIG. 11 is a flow chart showing the first example of the process of analysis which corresponds to the first example of the sub-routine of the step S110 of FIG. 6. According to this process, the processor 250 calculates the time from a first point at which the speed reaches 0 for the first time in consequence of the closing motion of the door (the point A of FIG. 8 mentioned above) to a second zero point at which the speed subsequently reaches 0 (the point B of FIG. 8) and, when the calculated time exceeds the prescribed time, judges that the closed slide door 400 is in the state of improper closure.

First, the processor 250 finds the point at which the speed reaches 0 for the first time in consequence of the closing motion of the door (the point A of FIG. 8) (the step S401) and then finds the point at which the speed subsequently reaches 0 (the point B of FIG. 8) (the step S402).

Then, the processor 250 finds the time between the point A and the point B (the step S403). That is, the time from the point at which the speed reaches 0 for the first time in consequence of the closing motion of the door (the point A of FIG. 8) to the point at which the speed subsequently reaches 0 (the point B of FIG. 8). The processor 250, for example, samples the measured data at a prescribed sampling period by the use of a timer now shown in the diagram. In this case, by multiplying the number of rounds of sampling between the point A and the point B by the sampling period, it is made possible to calculate the time from the point at which the speed reaches 0 for the first time during the closure of the door (the point A of FIG. 8) to the point at which the speed subsequently reaches 0 (the point B of FIG. 8).

Then, the time calculated at the step S403 and a prescribed time (hereinafter referred to as "the second prescribed time t2") are compared (the step S404). The second prescribed time t2 varies with the kind of vehicle and constitutes a parameter to be adjusted empirically. It particularly varies with the size of the slide door, the weight of the slide door, and the kind of a noise-proof/water-proof sealing member (an elastic material of rubber, for example) attached to an inner edge part of the slide door. When the calculated time exceeds the second prescribed time t2 (the step S404: YES), the processor 250 judges that the closed slide door 400 is in the state of improper closure (the step S405). When the calculated time falls short of the second prescribed time t2 (the step S404: NO), the processor 250 judges that the closed slide door 400 is in the status of complete closure and not in the state of improper closure (the step S406).

The fact that the change of speed varies when the door is in the state of improper closure and when the door is in the state of complete closure as described above is ascribable to the difference of mesh between the door lock mechanism 430 and the striker 440 disposed on the vehicle's main body side. Specifically, the latch of the door lock mechanism 430 and the striker 440 are meshed at a normal engaging position and enabled to assume a state of full latch when the door is in the state of complete closure. Consequently, the striker 440 is fixed comparatively firmly and the range of motion of the slide door is comparatively limited. Since the range of vibration of the slide door 400 is consequently limited, the state in which the speed of the slide door 400 assumes a negative value does not last for a long time.

When the door is in the state of improper closure, the latch of the door lock mechanism 430 and the striker 440 have not reached the position of normal mesh and are in the state of half latch. The position of the slide door 400, therefore, is not restricted so much as when the door is in the state of complete closure and the range of motion of the slide door 400 is comparatively wide. As a result, the state in which the speed of the slide door assumes a negative value last a longtime as compared with the care of the state of complete closure.

The component steps of the step S401-step S403 of FIG. 11 as described above correspond to one example of the process of the analyzing part for analyzing the behavior of the slide door 400 by processing the speed in consequence of the closing motion of the door and particularly correspond to the analyzing part which calculates the time from the first zero point at which the aforementioned speed attendant on the closing motion of the door reaches 0 for the first time to the second point at which the speed subsequently reaches 0. The component steps of the step S404-step S406 of FIG. 9 correspond to one example of the judging part which judges the state of closure of the closed slide door 400 based on the result of analysis and particularly correspond to the judging part which compares the time calculated by the aforementioned analyzing part and the prescribed time and, when the calculated time exceeds the prescribed time, judges that the closed slide door 400 is in the state of improper closure.

(The Second Example of Process of Analysis)

Now, the second example of the process of analysis will be explained below. In the first example of the process of analysis mentioned above, the time from the first zero point at which the speed attendant on the closing motion of the door reaches 0 for the first time (the point A of FIG. 8) to the second point at which the speed subsequently reaches 0 (the point B of FIG. 8) and, when the calculated time exceeds the prescribed time, judges that the closed slide door 400 is in the state of improper closure.

Depending on the kind of vehicle, however, the method of judgment which uses the time from the first zero point to the second point possibly may incur difficulty in judging the state of closure of door. The second example of the process of analysis contemplates the process is capable of easily judging the question as to whether or not the closed door is in the state of improper closure even for the kind of vehicle which allows no easy application of the method of judgment.

FIG. 12 is a diagram aiding in the explanation of the outline of the process according to the second example of the process of analysis. FIG. 12(A) shows in type section the speed data when the door is in the state of improper closure and FIG. 12(B) shows in type section the speed data when the door is in the state of complete closure.

The inversion of the slide door 400 attendant on the closing motion of the door induces the state in which the slide door moves in the direction opposite the direction of closure of the slide door (the state of inversion). In the present embodiment, only the speed data during the state of inversion are extracted from the speed data obtained at all the times subject to the measurement. Let the closing direction of the slide door constitute the positive direction, and the speed will assume a negative value because the slide door 400 is inverted by the repellent force. By extracting the region in which the speed assumes a negative value, therefore, it is made possible to extract only the speed data in the region of inversion. In FIG. 12, the part of the waveform existing below zero is corresponding to the speed data in the region of inversion.

Then, the peak value L which has the largest absolute value is sought out in the speed data in the state of inversion. Subsequently, the time of retaining the state in which the speed in the state of inversion exceeds the prescribed ratio (preferably 50%) based on the peak value L (referred to as the "retaining time") is calculated. When the retaining time exceeds the prescribed time (hereinafter referred to as "the third prescribed time t3"), the closed slide door 400 is judged to be in the state of improper closure. When the retaining time falls short of the third prescribed time t3, the closed slide door 400 is judged to be in the state of complete closure.

When the closed slide door 400 assumes the state of improper closure, the change of the speed in the neighborhood of the aforementioned peak is moderate in the state of inversion and the waveform described by the speed and the time t approximates the shape of a trapezoid as illustrated in type section in FIG. 12. Conversely, when the closed slide door 400 assumes the state of complete closure, the change of the speed in the neighborhood of the aforementioned peak is steep in the state of inversion and the waveform described by the speed and the time t approximates the shape of a triangle. As a result, when the closed slide door 400 assumes the state of improper closure, the retaining time is long as compared with the case in which the closed slide door 400 assumes the state of complete closure. The state of closure of the door, therefore, can be judged by the change of the retaining time.

Figure 13:
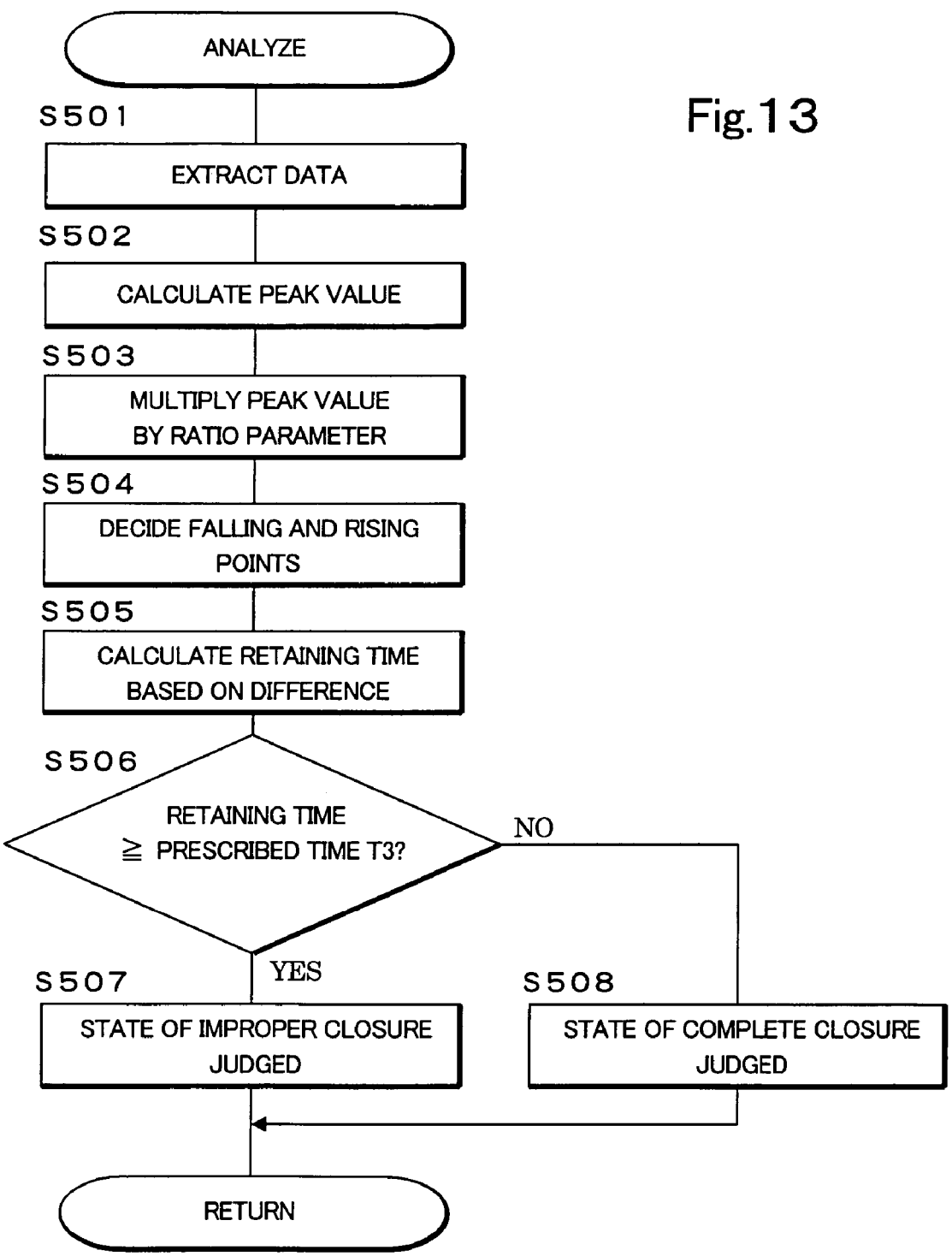
FIG. 13 is a flow chart illustrating the second example of the processing of analysis at Step S110 shown in FIG. 6.

Now, the contents of the process according to the second example of the process of analysis will be explained with reference to the flow chart of FIG. 13. FIG. 13 is a flow chart showing the second process of analysis, which corresponds to the second example of the sub-routine of the step S110 of FIG. 6.

First, the processor 250 extracts only the speed data in the state of inversion from the speed data obtained along the time series (the step S501). Specifically, the speed data in the region in which the speed is assuming a negative value is extracted because the speed in the state of inversion assumes a negative value. The extracted speed data indicate the speeds obtained at varying points and comprise the combinations of the speed and the time t.

The speed possibly varies periodically and the series of speed data possibly include a plurality of states of inversion. In this case, it is preferred that the speed data in each of the states of inversion is extracted.

Subsequently, the processor 250 seeks out the peak value L from among the speed data obtained in the individual states of inversion (the step S502). Here, the term "peak value L" means the peak in the absolute value of the speed in the state of inversion. From the viewpoint of precluding the influence of the noise, the procedure which comprises acquiring a plurality of values having gradually decreasing numerals and adopting the average value of the plurality of acquired values as the peak value L may be adopted instead of adopting the largest absolute value as the peak value L. The peak value L corresponds to the amplitude on the negative value side of the speed in the waveform described by the speed and the time t.

Then, the peak value found at the step S501 is multiplied by the ratio parameter (the step S503). Here, for the purpose of finding the amplitude of 50%, the value of L/2 is calculated by multiplying 0.5 as the ratio parameter. Preferably, the ratio parameter has been set in advance. The ratio parameter may be properly decided. If the ratio parameter is unduly low, the shortage will possibly render the judgment of the state of improper closure difficult when it is applied to the slide doors 400 of numerous kinds of vehicle. Conversely, if the ratio parameter is unduly high, the overage will possibly result in excessively reducing the retaining time and including an error due to the influence of noise, for example. The ratio parameter, therefore, is preferably set in the neighborhood of 0.5 (50%).

Then, from among the speed data of the state of inversion extracted at the step S501, two points at which the absolute value of the speed constitutes the value L/2 corresponding to the prescribed ratio (50%) of the peak value L are decided (the step S504). To be specific, when the speed in the state of inversion is plotted in the vertical axis (positive in the upper direction) and the time t is plotted in the horizontal axis, the speed falls, then reaches the peak value, and thereafter rises. As a result, the falling point at which the speed during the fall reaches the value L/2 and the rising point at which the speed during the rise reaches the value L/2 exist. At the step S504, therefore, the falling point and the rising point at which the absolute value of the speed constitutes the value L/2 corresponding to the prescribed ratio (50%) of the aforementioned peak value are both decided.

Then, the difference of time between the falling point and the rising point is found and the retaining time in which the absolute value of the speed in the state of inversion retains the state of exceeding the prescribed ratio (50%) based on the peak value of the absolute value of the speed in the state of inversion is calculated (the step S505).

Then, the question as to whether or not the calculated retaining time exceeds the third prescribed time t3 is judged (the step S506). When the calculated retaining time exceeds the third prescribed time t3 (the step S506: YES), it is judged that the closed slide door 400 is in the state of improper closure (the step S507). When the calculated retaining time falls short of the third prescribed time t3 (the step S505: NO), the closed slide door 400 is judged to be in the state of complete closure (the step S508).

The third prescribed time t3 can be empirically fixed in advance. By fixing the third prescribed time t3 to be 10 millisecond, for example, the question as to whether or not the slide door 400 is in the state of improper closure can be accurately judged.

The component steps of the step S501-step S505 of FIG. 13 correspond to the analyzing part which calculates the retaining time in which the absolute value of the speed of the slide door 400 moving in the direction opposite the closing direction of the slide door 400 in the state of inversion remains in the state of exceeding the prescribed ratio based on the peak value of the absolute value of the speed in the state of inversion. Then, the component steps of the step S506-step S508 of FIG. 13 correspond to the judging part which judges the closed slid door 400 to be in the state of improper closure when the retaining time and the third prescribed time t3 are compared and the calculated retaining time is found to exceed the third prescribed time t3.

To be more specific, the process which is shown in the step S501 corresponds to the inverted state extracting part which extracts the speed date in the state of inversion from the speed data. The process shown in the step S502 corresponds to the peak detecting part which seeks the peal value from among the speed data extracted in the state of inversion. The processes shown in the step S503 and the step S504 correspond to the deciding part which decides the rising point and the falling point at which the absolute value of the speed in the state of inversion assumes the value corresponding to the prescribed ratio (such as, for example, 50%) of the aforementioned peak value. Then, the process shown in the step S505 corresponds to the differentiating part which seeks the time difference between the falling point and the rising point and calculates the retaining time.

(The Third Example of the Process of Analysis)

Now, the third example of the process of analysis will be explained below. The first and second examples of the process of analysis described above have illustrated the case of directly analyzing the speed of the slide door 400 changing in consequence of the closing motion of door and judging the state of closure of the slide door 400. In the present embodiment, the case of analyzing the position data of the slide door 400 obtained by processing the speed and judging the state of closure of the slide door 400 will be explained.

Figure 14:
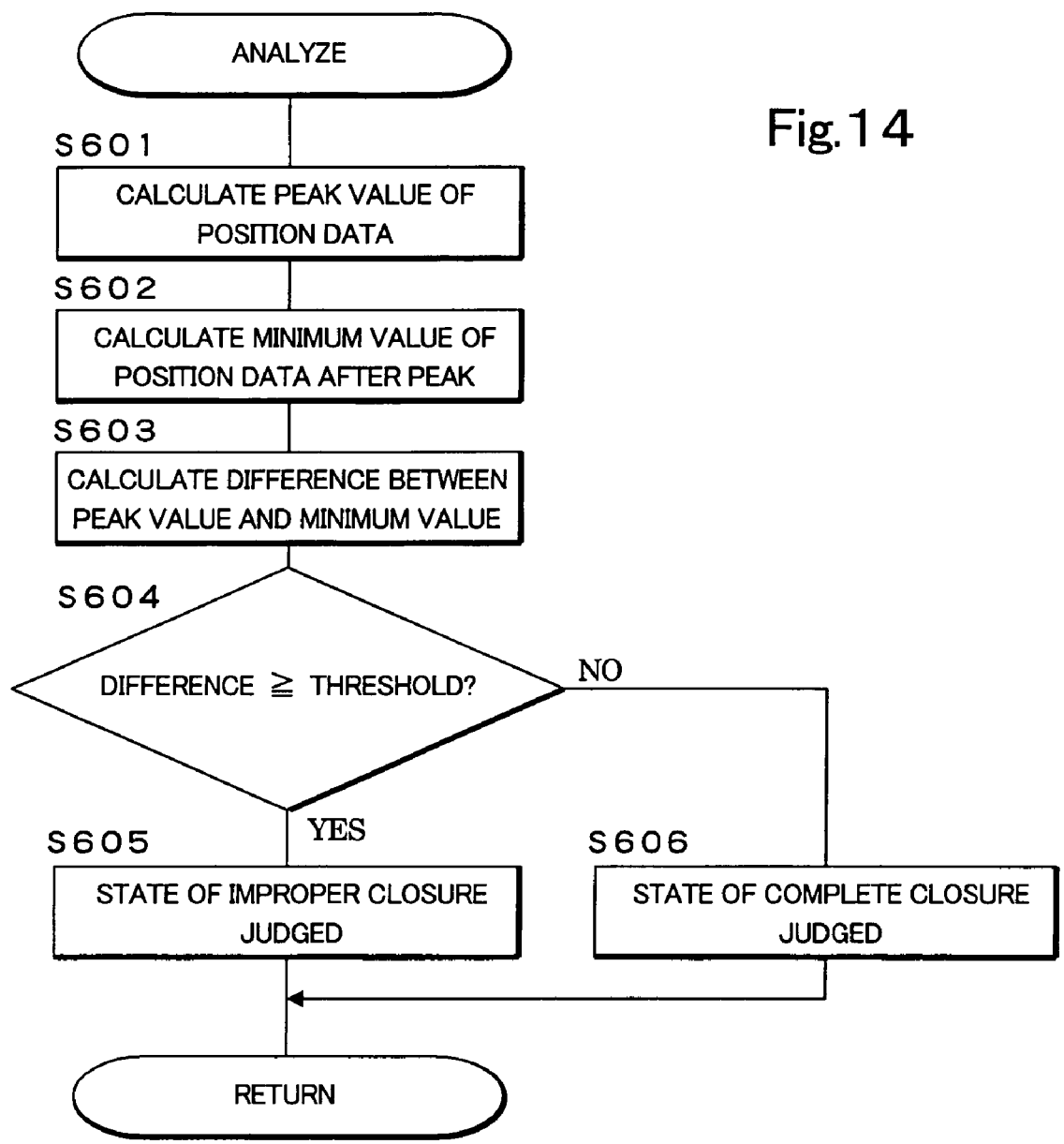
FIG. 14 is a flow chart illustrating the third example of the processing of analysis at Step S110 shown in FIG. 6.

FIG. 14 is a flow chart showing the third example of the process of analysis, which corresponds to the third example of the sub-routine of the step S110 of FIG. 6.

First, in the process of analysis shown in FIG. 14, the position data (stroke) regarding the position of the slide door 400 obtained by subjecting the calculated speed to time integration is used. In the present embodiment, the position data regarding the position of the slide door 400 calculated by the process of the step S108 of FIG. 6 mentioned above can be used as it is.

Figure 15:
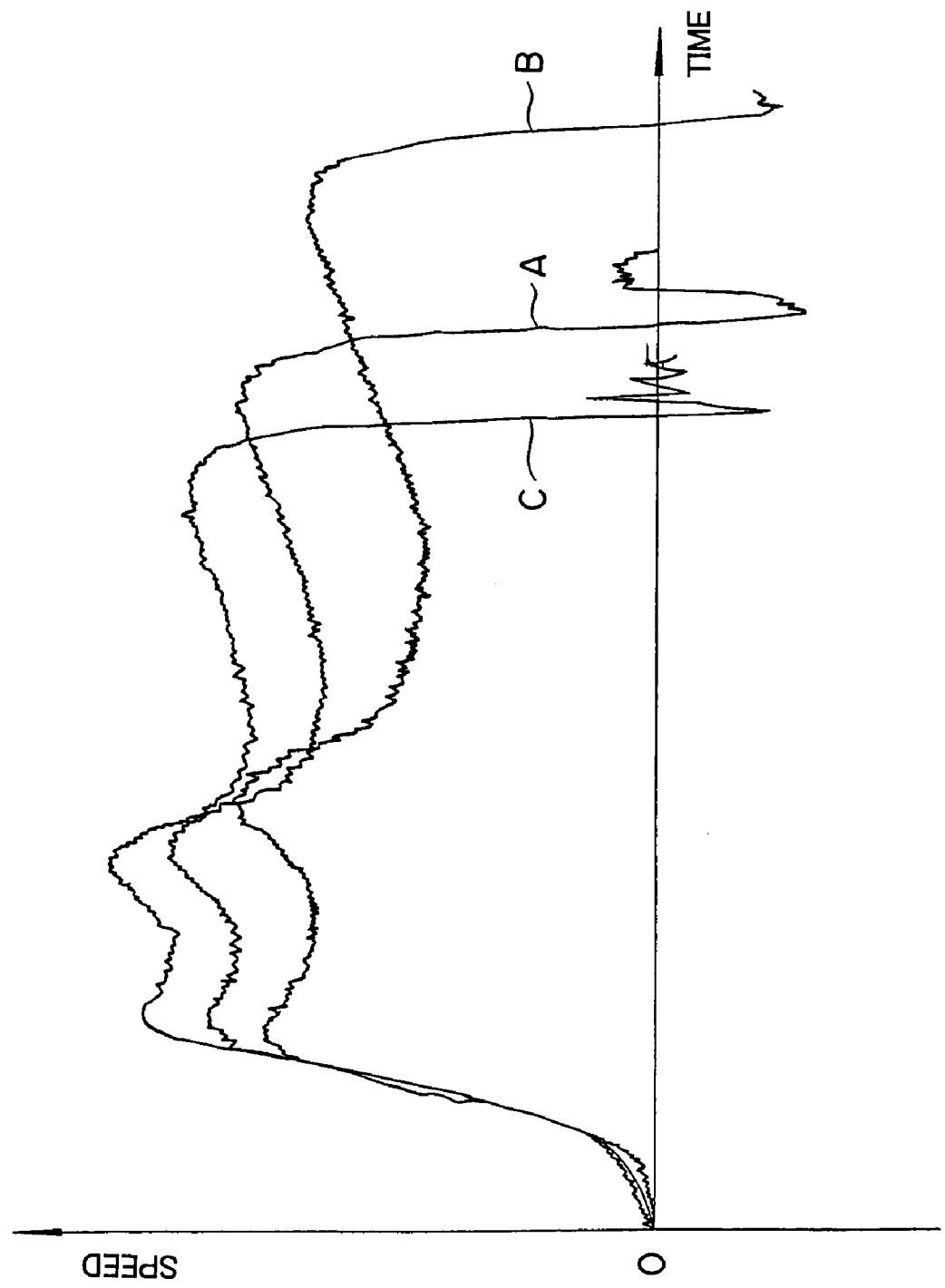
FIG. 15 is a diagram illustrating an example of a speed of a slide type door.
Figure 16:
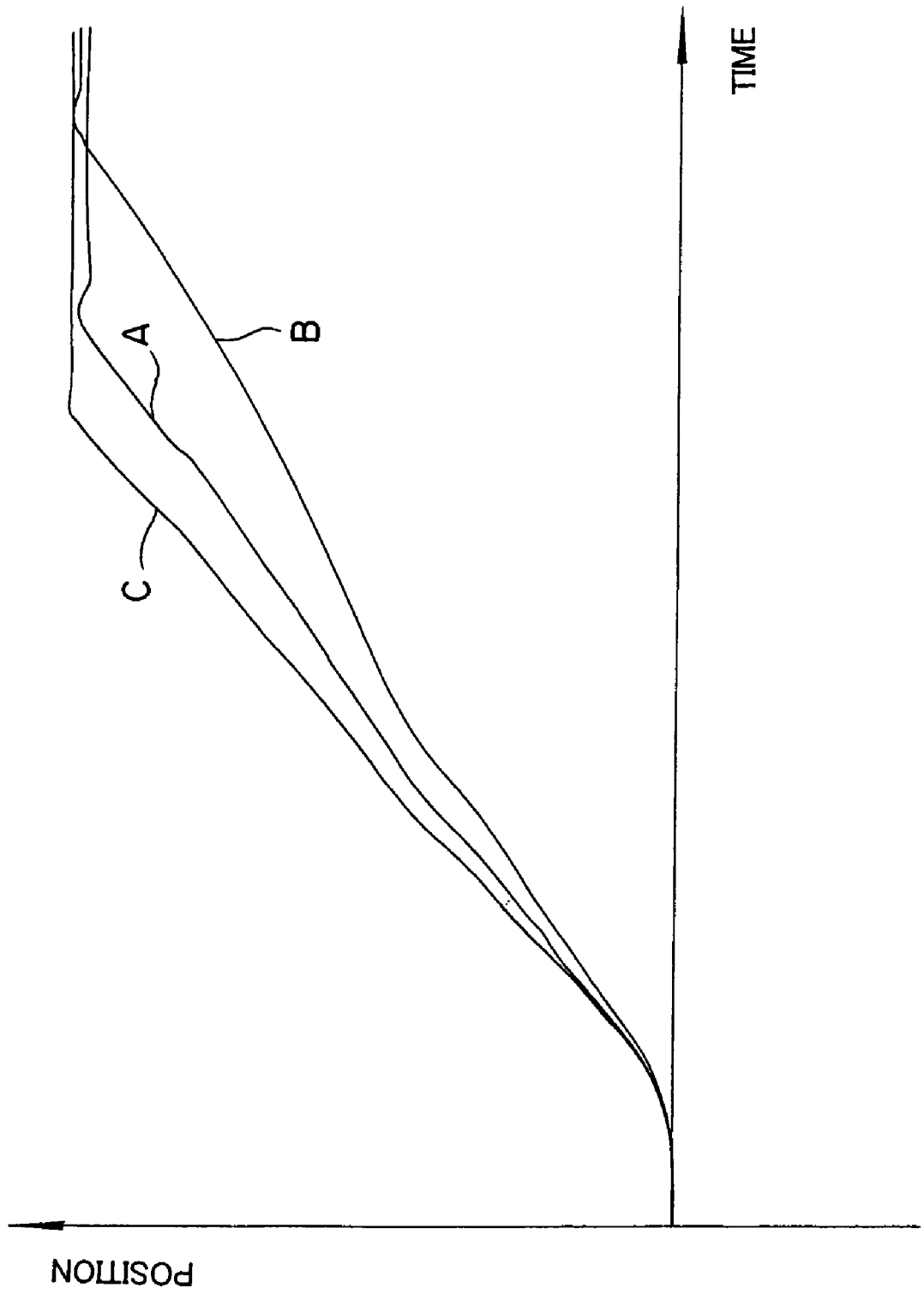
FIG. 16 is an example of a calculation of a position data resulting from a time integration of the speed shown in FIG. 15.

FIG. 15 illustrates examples (Example A, Example B, and Example C) of the speed of the slide door 400 and FIG. 16 illustrates the examples of calculation of the position data obtained by subjecting the speeds of Example A, Example B, and Example C shown in FIG. 15 to time integration. Example A and Example B represent the cases in which the closed slide door 400 assumed the state of improper closure and Example C represents the case in which the closed slide door 400 assumed the state of complete closure.

In the state in which the position data have been calculated, first a peak value Max is calculated from among the calculated position data (the step S601 of FIG. 14). From the viewpoint of allaying the influence of noise, the procedure which comprises acquiring a plurality of values in the direction of gradually decreasing position data and adopting the average value of the plurality of values as the peak value Max may be adopted instead of adopting the maximum value of the actual position data as the peak value Max. Optionally, the peak value Max may be sought out after the position data has been subjected to the process for removal of noise as by smoothing.

Then, a point $t_L$ at which the peak value Max has occurred is specified and a minimum value Min of the position data at and after this point $t_L$ is sought out (the step S602). Again in this case, the minimum value Min may be optionally sought out after the position data have been subjected to the process for removal of noise. Then, the processor 250 calculates a difference between the peak value Max sought out at the step S601 and the minimum value Min sought out at the step S602 (the step S603).

Figure 17:
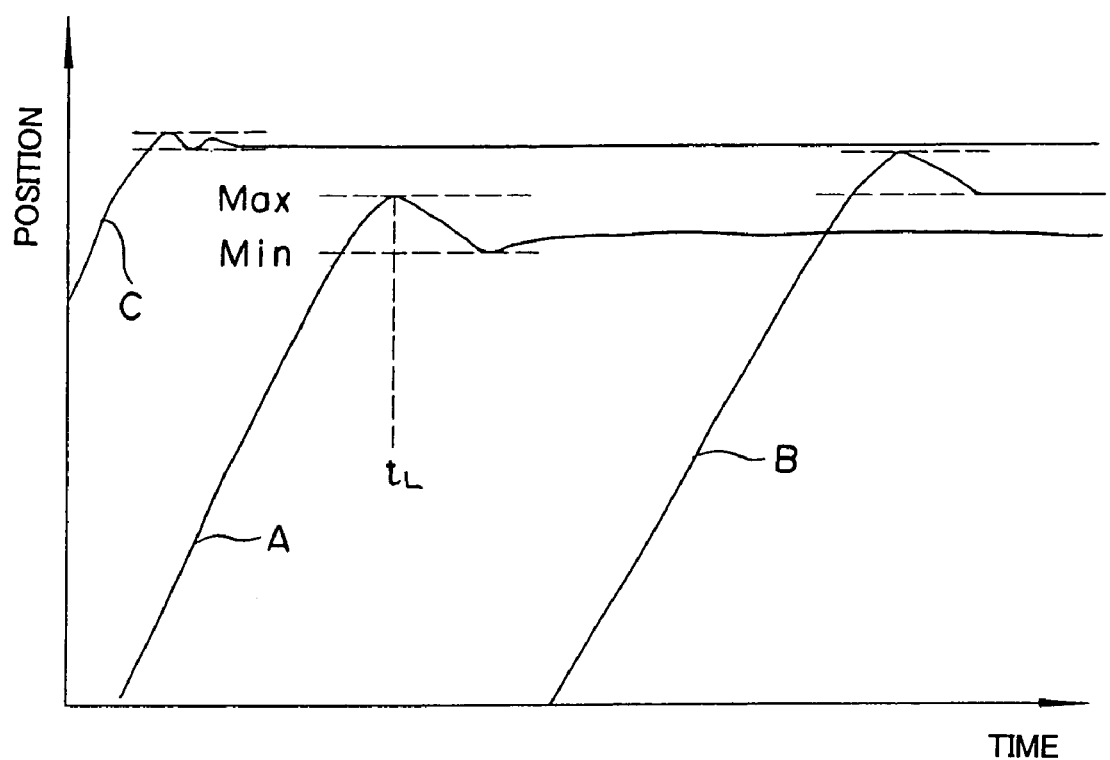
FIG. 17 is a magnified diagram of the neighborhood of a peak value of the position data shown in FIG. 16.

The contents of the processes of these step S601-step S603 will be explained below with reference to FIG. 17. FIG. 17 is a magnified diagram of the neighborhood of the peak values of the position data A, B, and C of FIG. 16. As shown in FIG. 17, the difference between the peak value Max of the position data and the minimum value Min of the position data obtained at and after the point $t_L$ at which the peak value Max has occurred (Max−Min) is calculated.

After the calculation of this difference has been completed, the processor 250 subsequently compared the calculated difference (Max−Min) and the prescribed threshold k1 and judges the question as to whether or not the calculated difference exceeds the threshold k1 (the step S604 of FIG. 14). As a result, the closed door 400 is judged to be in the state of improper closure (the step S605) when the calculated difference exceeds the threshold k1 (the step S604: YES). Conversely, the closed slide door 400 is judged to be in the state of improper closure (the step S606) when the calculated difference falls short of the threshold k1 (the Step S604: NO).

The threshold k1 can be decided empirically in advance. By setting the threshold k1 at 0.012 m, for example, the question as to whether or not the closed slide door 400 is in the state of improper closure.

The component steps of the step S601-step S603 of FIG. 14 as described above correspond to the analyzing part which calculates the difference between the peak value of the position data calculated by the door position calculating part and the minimum value of the position data obtained after the point at which the peak value has occurred. The processes shown at the step S604-step S606 of FIG. 14 correspond to the judging part which compares the difference calculated by the analyzing part and the prescribed threshold k1 and, when the calculated difference exceeds the threshold k1, judges the question as to whether or not the closed slide door 400 is in the state of improper closure.

The plurality of processes of analysis have been explained with reference to the flow charts of FIG. 11, FIG. 13, and FIG. 14. The state of closure of the closed slide door 400 may be judged by integrating the plurality of results of analysis.

For example, the state of closure of the closed slide door 400 can be finally judged by integrating the judgment of the state of door based on the analysis of the change of speed shown in FIG. 13 and the judgment of the state of door based on the analysis of the change of position data shown in FIG. 14 by using the logical operation.

The closed slide door 400 can be finally judged to be in the state of improper closure when at least either of the results of analysis of the change of speed and the results of analysis of the change of position data judges the closed door 400 to be in the state of improper closure. Conversely, the closed slide door 400 can be finally judged to be in the state of complete closure when both of the results of analysis of the change of speed and the results of analysis of the change of position data judge that the closed slide door 400 is in the state of complete closure.

The testing device of the form of the embodiments described above may manifest the following effects.

In the present embodiments, the behavior of the slide door 400 is analyzed by processing the speed of the slide door 40 changing in consequence of the closing motion of the door and the state of closure of the slide door 400 is judged based on the result of the analysis. Thus, unlike the judgment of the state of closure of the sliding door by the use of an optical detector, the present judgment enables the test to avoid relying on the position for mounting the sensor. As a result, the period of time for preparing the test can be reduced and the efficiency of operation can be exalted.

Since the speed of the slide door 400 is calculated based on the acceleration measured by the acceleration sensor 100, unlike the calculation of the speed of the slide door 400 by the use of an article of limited size as an object for detection and an optical detector, the speed of the slide door 400 can be continuously calculated throughout the range from the slide door 400 is opened till it is closed. As a result, more detailed information can be obtained.

Further, in the present embodiments, the judgment of the state of closure of the closed slide door 400 and the calculation of the speed of the slide door 400 are executed based on the data of speed measured by one acceleration sensor. As a result, the sensor for judging the state of closure of door and the sensor for measuring the speed of motion of the slide door 400 do not need to be mounted independently. The present mode is instrumental in economizing the memory capacity because a plurality of kinds of live data (measured values) obtained by a plurality of kinds of sensor do not need to be memorized.

The acceleration sensor 100 which is used in the present embodiments is furnished with a magnet 110 or a sucking disc. The operator, therefore, can easily set the acceleration sensor 100 in position. As a result, the time required for the work of setting the acceleration sensor 100 can be curtailed.

In the case of calculating the first speed and the second speed by subjecting the accelerations obtained in the two directions, namely one forward and one reverse direction of the time axis, to time integration, averaging the first speed and the second speed, and finally obtaining the speed of the slide door 400, the influence of noise can be alleviated and the speed can be calculated accurately.

When the time in which the speed in the opposite direction continues is judged to be longer than the first prescribed time, the testing device is initialized for the purpose of newly judging the state of closure of door. That is, the state of starting the test can be automatically judged. The operato is not required to designate the start of the test every time the slide door 400 is opened.

Since the speed at which the slide door 400 passes through the prescribed interval E preceding the rail curved part 412 guiding the slide door 400 in the direction of the interior of a vehicle body during the closure of the slide door 400 is extracted based on the position data regarding the position of the slide door 400 and the extracted speed can be used as the speed subject to estimation during the estimation of the performance of closure of the door, the influence of the deceleration of the slide door 400 due to the approach of the slide door 400 to the rail curved part 412 can be eliminated and the performance of closure of the door can be evaluated accurately.

Further, by judging the state of a door by comparing the retaining time and the prescribed time, it is made possible to reduce the dispersion between kinds of vehicle and between kinds of door and the accuracy of judgment of the question as to whether or not the closed slide door 400 is in the state of improper closure can be exalted. When the retaining time and the prescribed time are compared, since the retaining time is calculated by using the value corresponding to the prescribed ratio of the peak value, the influence of the change of the peak value is reduced and the reproducibility of the judgment of the state of door is exalted.

The state of closure of the slide door 400 can be judged by utilizing the position data obtained by further subjecting the speed to time integration. Again in this case, the accuracy of the judgment of the question as to whether or not the closed slide door is in the state of improper closure can be heightened. Thus, the application of the testing device of this invention to the slide doors in numerous kinds of vehicle can be facilitated.

The question whether or not the closed slide door 400 is in the state of improper closure can be judged, when necessary, by integrating the analysis of the change of speed and the analysis of the change in position data. As a result, it is made possible to judge the state of improper closure of door more accurately while the plurality of kinds of process of analysis is mutually complemented. Since the plurality of kinds of process of analysis can be executed based on the data obtained by one kind of sensor, there is no need to install a plurality of kinds of sensor. As a result, the performance of closure of door is evaluated accurately while the elongation of the time for preparing the operation is prevented.

The testing device in the preferred embodiments of this invention has been explained. Naturally, this invention can be properly added, altered, or omitted within the scope of the technical idea thereof by a person skilled in the art.

The foregoing explanation has illustrated the processes of analysis shown in FIG. 11, FIG. 13, and FIG. 14 and the process of integrating a plurality of processes selected from these processes. This invention, however, is not limited to these processes. Other method of process can be adopted so long as it is furnished with a construction which is capable of executing the analysis of the behavior of the aforementioned door by processing the speed attendant on the closing motion of the door and judging the state of closure of the closed door based on the result of this analysis. For example, the analyzing part can be relied on to calculate the time of attenuation which lasts till the width of change of the speed attendant on the closing motion of the door attenuates to the prescribed proportion within the region in which the speed changes periodically and the judging part is relied on to compare the time of attenuation and the prescribed time and, when the time of attenuation exceeds the prescribed time, judge the closed slide door 400 to be in the state of improper closure. Otherwise, the analyzing part can be relied on to calculate the frequency of the change in time of the speed in the region in which the speed attendant on the closing motion of door is changed periodically and the judging part can be relied on to compare the calculated frequency and the prescribed frequency and, when the calculated frequency falls short of the prescribed frequency, judge the closed slide door 400 to be in the state of improper closure.

Further, the component process steps corresponding to the process of calculation of speed, the process of analysis, the process of judgment, the process of judgment of continuous time, the process of initialization, the process of calculation of the door position, and the process of extraction shown in the flow charts described above may be realized by the software which is executed by the processor 250 as described above or may be realized by the hardware such as the logic IC for exclusive use, for example.

The entire disclosure of Japanese Patent Application No. 2004-358317 filed on Dec. 10, 2004 including specification, claims, drawings, and summary are incorporated herein by reference in its entirety.

What is claimed is:

1. A testing device for evaluating performance of closure of a vehicle door, comprising:

a speed calculating part for calculating a speed of the vehicle door during a motion of the door relative to a main body of a vehicle, wherein the door is a slide door which moves translationally relative to the main body of the vehicle;

an analyzing part for analyzing behavior of the door by processing the speed changing in consequence of a closing motion of the door;

a judging part for judging a state of closure of the door based on a result of the analysis obtained by the analyzing part; and an acceleration measuring part attached to the door and adapted to measure acceleration of the door during the translational motion of the door, wherein the speed calculating part calculates the speed of the door by subjecting the measured acceleration to time integration, and wherein the speed calculating part comprises:

a first speed calculating part for calculating a first speed by subjecting the measured acceleration in a forward direction of a time axis to time integration, a second speed calculating part for calculating a second speed by subjecting the measured acceleration in an opposite direction of the time axis to time integration, and an averaging part for obtaining the speed of the door by averaging the first speed and the second speed.

2. A testing device for evaluating performance of closure of a vehicle door, comprising:

a speed calculating part for calculating a speed of the vehicle door during a motion of the door relative to a main body of a vehicle;

an analyzing part for analyzing behavior of the door by processing the speed changing in consequence of a closing motion of the door;

a judging part for judging a state of closure of the door based on a result of the analysis obtained by the analyzing part;

a continuous time judging part for judging whether or not a time for continuing the speed in a direction opposite to a direction of the closing motion of the door is longer than a first prescribed time; and an initiating part for executing initialization of the device when the time for continuing the speed in the opposite direction is judged to be longer than the first prescribed time.

3. A testing device according to claim 2, wherein the door is a slide door which moves translationally relative to the main body of the vehicle.

4. A testing device according to claim 3, further comprising an acceleration measuring part attached to the door and adapted to measure acceleration of the door during the translational motion of the door, wherein the speed calculating part calculates the speed of the door by subjecting the measured acceleration to time integration.

5. A testing device according to claim 4, wherein the acceleration measuring part is furnished with a magnet and is removably attached to an outer plate of the door by dint of the magnet.

6. A testing device according to claim 4, wherein the acceleration measuring part is furnished with a suction cup and is removably attached to an outer plate of the door by dint of the suction cup.

7. A testing device according to claim 3, wherein the analyzing part is adapted for:
   detecting speed data of the door for each instance of time while the door moves in direction opposite to the direction of the closing motion of the door following the closing motion of the door,
   seeking a peak value from absolute values of the detected speed data;
   calculating a prescribed proportion of the peak value; and
   obtaining an amount of time in which the absolute values of the detected speed data continuously exceed the prescribed proportion, and
   wherein the judging part compares the obtained time with a prescribed time and, when the obtained time is longer than the prescribed time, judges the door to be in a state of improper closure.

8. A testing device according to claim 3, further comprising a door position calculating part for calculating a position of the door by subjecting the calculated speed to time integration,
   wherein the analyzing part calculates a difference between a peak value of the calculated position and a minimum value of the calculated position after the occurrence of the peak value, and
   wherein the judging part compares the calculated difference with a prescribed threshold and, when the calculated difference exceeds the threshold, judges the door to be in a state of improper closure.

9. A testing device for evaluating performance of closure of a vehicle door, comprising:
   a speed calculating part for calculating a speed of the vehicle door during a motion of the door relative to a main body of a vehicle;
   an analyzing part for analyzing behavior of the door by processing the speed changing in consequence of a closing motion of the door;
   a judging part for judging a state of closure of the door based on a result of the analysis obtained by the analyzing part;
   a door position calculating part for calculating position data regarding a position of the door by subjecting the calculated speed to time integration; and
   an extracting part for extracting the speed of a passage of the door through a prescribed interval preceding a rail curved part guiding the door toward an interior of the vehicle body during the closing motion of the door based on the position data,
   wherein the door is a slide door which moves translationally relative to the main body of the vehicle.

10. A testing device according to claim 9, further comprising an evaluating part for evaluating the performance of closure of the door based on the state of closure of the door judged by the judging part and the speed extracted by the extracting part.

11. A testing device for evaluating performance of closure of a vehicle door, comprising:
    a speed calculating part for calculating a speed of the vehicle door during a motion of the door relative to a main body of a vehicle;
    an analyzing part for analyzing behavior of the door by processing the speed changing in consequence of a closing motion of the door; and
    a judging part for judging a state of closure of the door based on a result of the analysis obtained by the analyzing part,
    wherein the door is a slide door which moves translationally relative to the main body of the vehicle,
    wherein the analyzing part calculates time from a first zero point at which the speed during the closing motion of the door reaches zero for a first time to a second zero point at which the speed subsequently reaches zero, and
    wherein the judging part compares the calculated time from the first zero point to the second zero point with a prescribed time and, when the calculated time exceeds the prescribed time, judges the door to be in a state of improper closure.

12. A testing method for evaluating performance of closure of a vehicle door, comprising steps of:
    calculating a speed of a vehicle slide door during a translational motion of the door relative to a main body of a vehicle by measuring an acceleration of the door during the translational motion of the door, calculating a first speed by subjecting the measured acceleration in a forward direction of a time axis to time integration, calculating a second speed by subjecting the measured acceleration in an opposite direction of the time axis to time integration, and obtaining the speed of the door by averaging the first speed and the second speed;
    analyzing behavior of the door by processing the speed changing in consequence of a closing motion of the door; and
    judging a state of closure of the door based on a result of analysis obtained by the analyzing step.

13. A testing method for evaluating performance of closure of a vehicle door, comprising steps of:
    calculating a speed of the vehicle door during a motion of the door relative to a main body of a vehicle;
    analyzing behavior of the door by processing the speed changing in consequence of a closing motion of the door;
    judging a state of closure of the door based on a result of the analysis obtained by the analyzing step;
    judging whether or not a time for continuing the speed in a direction opposite to a direction of the closing motion is longer than a first prescribed time; and
    executing an initialization of a testing device when the time for continuing the speed in the opposite direction is judged to be longer than the first prescribed time.

14. A testing method for evaluating performance of closure of a vehicle door, comprising steps of:
    calculating a speed of the vehicle door during a motion of the door relative to a main body of a vehicle, wherein the door is a slide door which moves translationally relative to the main body of the vehicle;
    calculating position data regarding a position of the door by subjecting the calculated speed to time integration;
    extracting a speed of a passage of the door through a prescribed interval preceding a rail curved part guiding the door toward an interior of the vehicle body during a closing motion of the door based on the position data;
    analyzing behavior of the door by processing the speed of the vehicle door changing in consequence of the closing motion of the door; and
    judging a state of closure of the door based on a result of the analysis obtained by the analyzing step.

15. A testing method according to claim 14, further comprising a step of evaluating a performance of closure of the door based on the state of closure of door judged by the judging step and the speed extracted by the extracting step.

16. A testing method for evaluating performance of closure of a vehicle door, comprising steps of:
- calculating a speed of the vehicle door during a motion of the door relative to a main body of a vehicle, wherein the door is a slide door which moves translationally relative to the main body of the vehicle;
- analyzing behavior of the door by processing the speed changing in consequence of a closing motion of the door by calculating time from a first zero point at which the speed during the closing motion of the door reaches zero for a first time to a second zero point at which the speed subsequently reaches zero; and
- judging a state of closure of the door based on a result of the analysis obtained by the analyzing step by comparing the calculated time from the first zero point to the second zero point with a prescribed time and, when the calculated time exceeds the prescribed time, the door is judged to be in a state of improper closure.

17. A testing device for evaluating performance of closure of a vehicle door, comprising:
- a speed calculating part for calculating speed of the vehicle door during a motion of the door relative to a main body of a vehicle;
- a door position calculating part for calculating position of the door by subjecting the calculated speed to time integration;
- an analyzing part for analyzing behavior of the door by processing the calculated position changing in consequence of a closing motion of the door in which the door moves in an unobstructed manner; and
- a judging part for judging the door to be in a state of improper closure based on a result of the analysis obtained by the analyzing part.

18. A testing device according to claim 17, wherein the analyzing part calculates a difference between a peak value of the calculated position for each instant of time and a minimum value of the calculated position after the occurrence of the peak value, and,
- wherein the judging part compares the calculated difference with a prescribed threshold and, when the calculated difference exceeds the threshold, judges the door to be in the state of improper closure.

* * * * *